United States Patent [19]
Sugahara et al.

[11] Patent Number: 5,943,033
[45] Date of Patent: Aug. 24, 1999

[54] DISPLAY DEVICE

[75] Inventors: Atsushi Sugahara, Yokohama; Kazuki Taira, Kawasaki, both of Japan

[73] Assignee: Kabushiki Kaisha Toshiba, Kawasaki, Japan

[21] Appl. No.: 08/523,294

[22] Filed: Sep. 5, 1995

[30] Foreign Application Priority Data

| Sep. 6, 1994 | [JP] | Japan | 6-212244 |
| Jan. 18, 1995 | [JP] | Japan | 7-005743 |
| Mar. 30, 1995 | [JP] | Japan | 7-072676 |
| Mar. 30, 1995 | [JP] | Japan | 7-072683 |

[51] Int. Cl.$^6$ .................................................. G09G 3/34
[52] U.S. Cl. .................................. 345/85; 345/7; 345/48
[58] Field of Search .................................. 345/7, 48, 84, 345/85; 359/227

[56] References Cited

U.S. PATENT DOCUMENTS

| 3,924,228 | 12/1975 | Goodrich | 345/48 |
| 4,091,382 | 5/1978 | Anderson et al. | 345/48 |
| 4,248,501 | 2/1981 | Simpson | 359/227 |
| 4,336,536 | 6/1982 | Kalt et al. | 345/85 |
| 4,420,896 | 12/1983 | Castleberry . | |
| 4,420,897 | 12/1983 | Castleberry | 345/48 |
| 4,564,836 | 1/1986 | Vuilleumier et al. | 345/85 |
| 4,794,370 | 12/1988 | Simpson et al. | 345/85 |
| 4,831,371 | 5/1989 | Hata | 345/85 |
| 4,891,635 | 1/1990 | Hata | 345/85 |
| 5,041,965 | 8/1991 | Chen | 345/7 |
| 5,159,225 | 10/1992 | Um . | |
| 5,638,084 | 6/1997 | Kalt | 345/85 |

FOREIGN PATENT DOCUMENTS

| 4-240890 | 8/1992 | Japan . |
| WO 92/02846 | 2/1992 | WIPO . |

OTHER PUBLICATIONS

Patent Abstracts of Japan, vol. 11, No. 95 (E–492)[2542], Mar. 25, 1987, JP–A–61 247 283, Nov. 6, 1986.

*Primary Examiner*—Richard A. Hjerpe
*Assistant Examiner*—M. Fatahiyar
*Attorney, Agent, or Firm*—Oblon, Spivak, McClelland, Maier & Neustadt, P.C.

[57] ABSTRACT

White opaque fixed films in a fixed section are arranged in a two-dimensional matrix. On each fixed film, a cyan transparent film, a magenta transparent film, and a yellow transparent film that constitute a pixel are placed. By electrostatic force, these transparent films are driven and placed under the fixed film of an adjacent pixel, thereby controlling the color of the pixel. To generate electrostatic force, the fixed film and transparent film are provided with electrodes and an insulating film is inserted between these two films. The consecutive reversing of the polarity of both electrodes enables the transparent film to move in parallel with the fixed section. To achieve half tone display and no power consumption in displaying a still picture, an electrostatic mechanical latch mechanism that stops the film still in motion is employed.

47 Claims, 31 Drawing Sheets

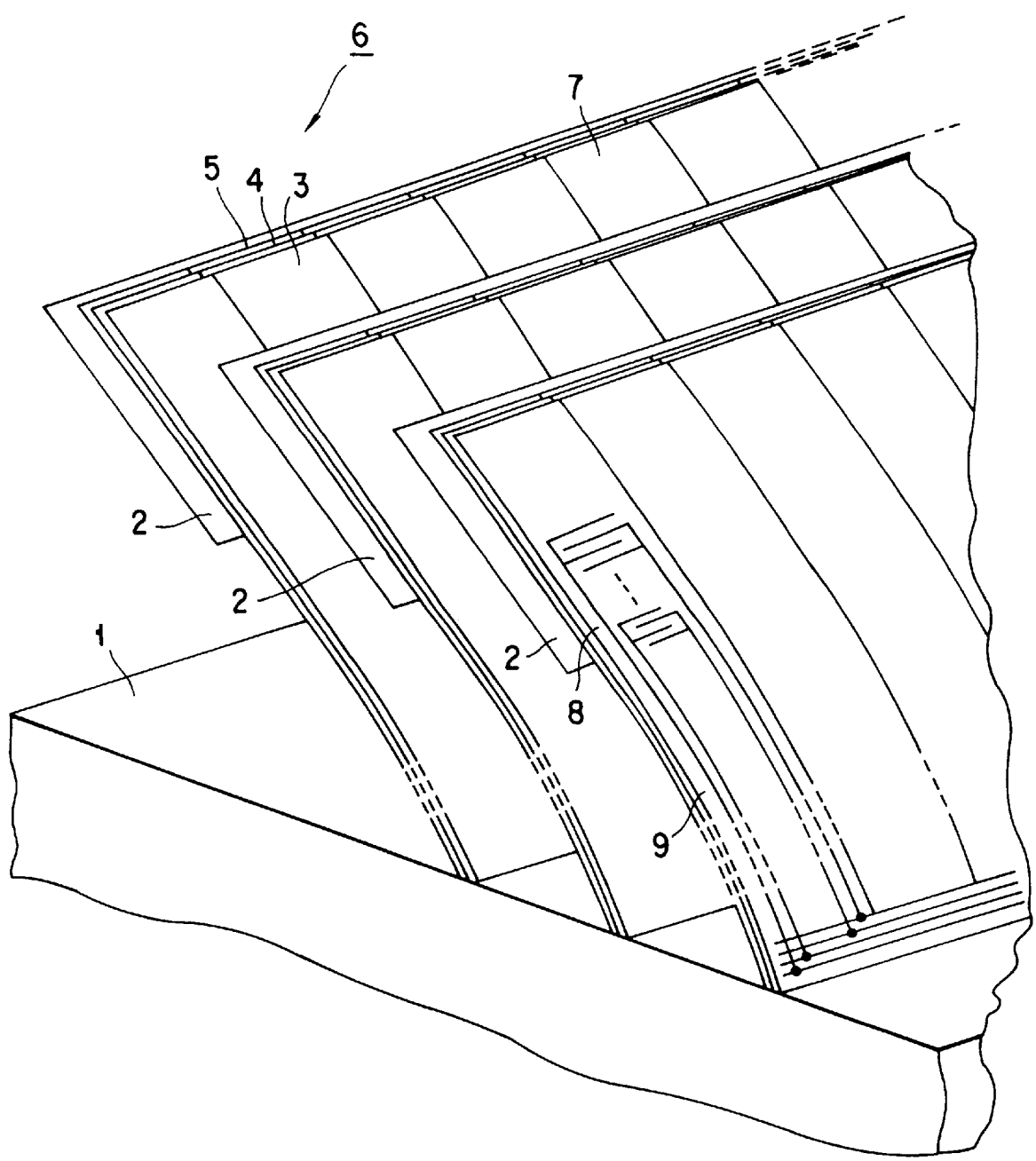
F I G. 1

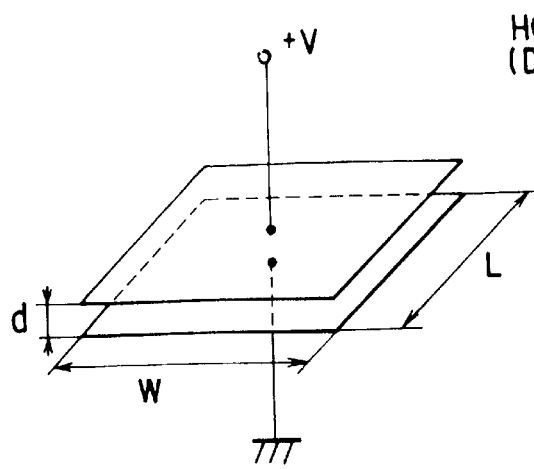
FIG. 7A
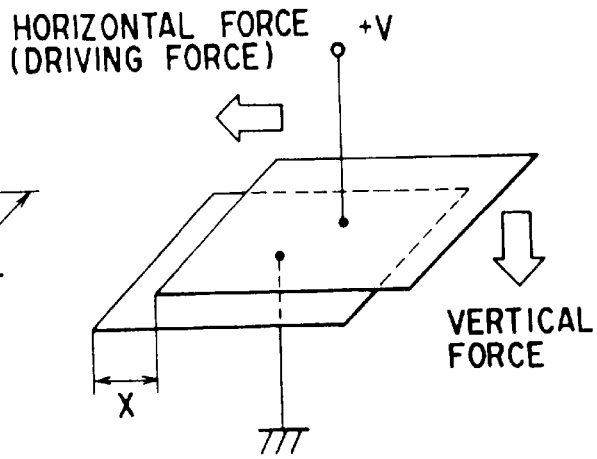
FIG. 7B
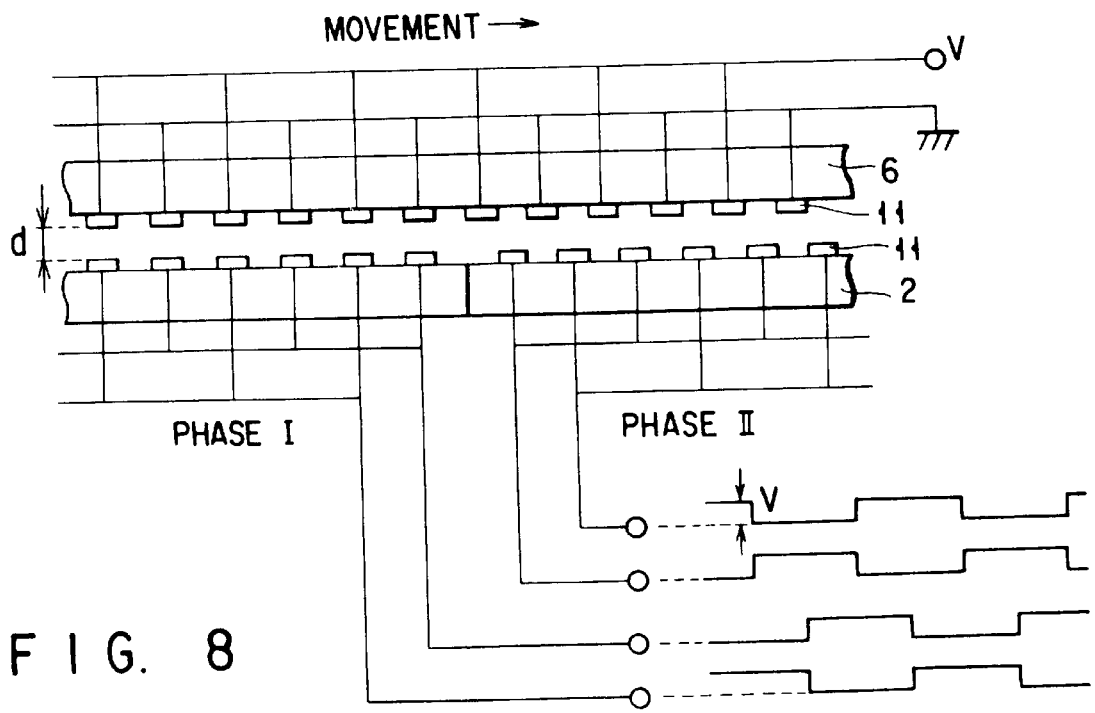
FIG. 8
FIG. 9A  REF·CLK
FIG. 9B  PRECEDING PULSE
FIG. 9C  SUCCEEDING PULSE

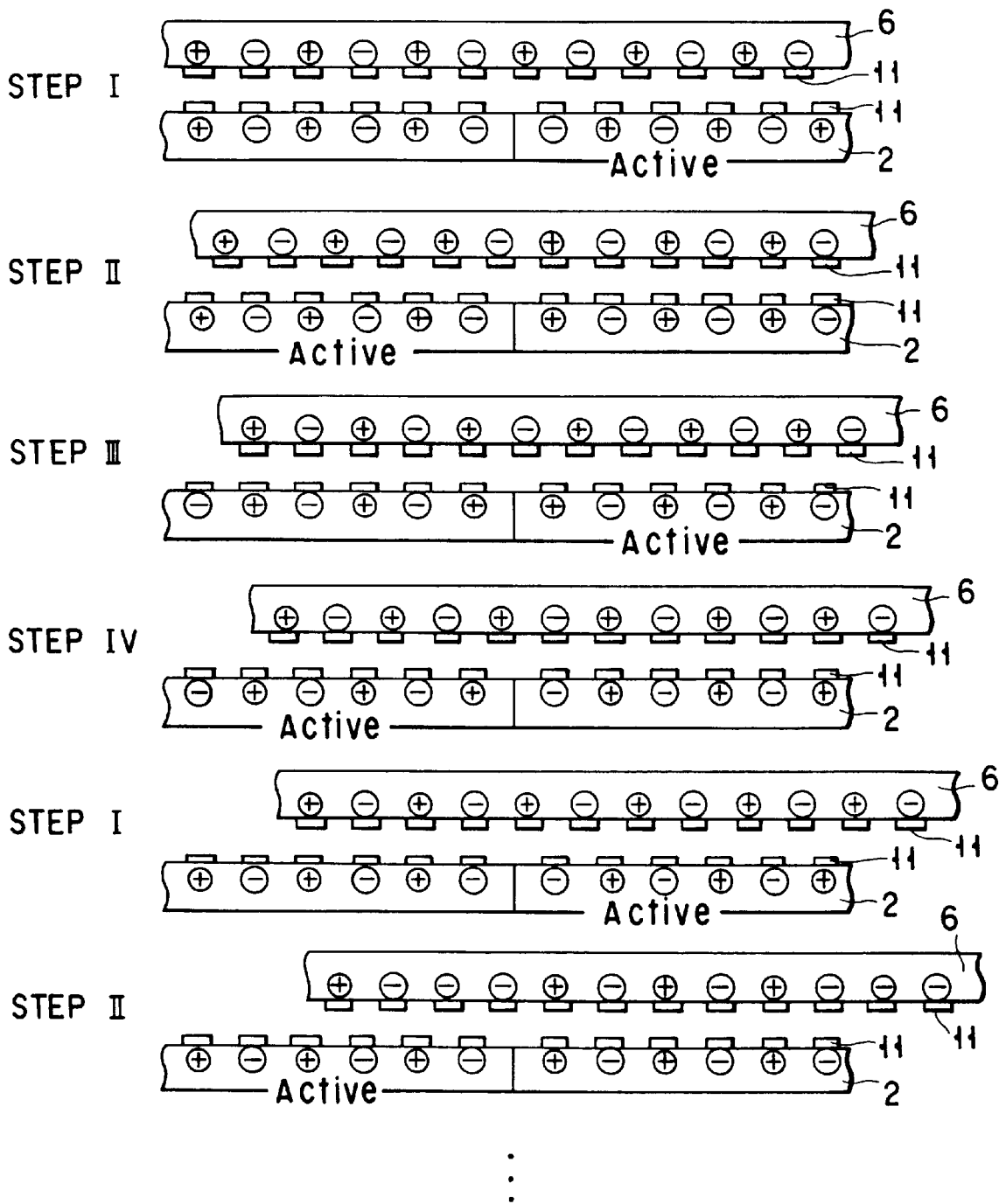
F I G. 11

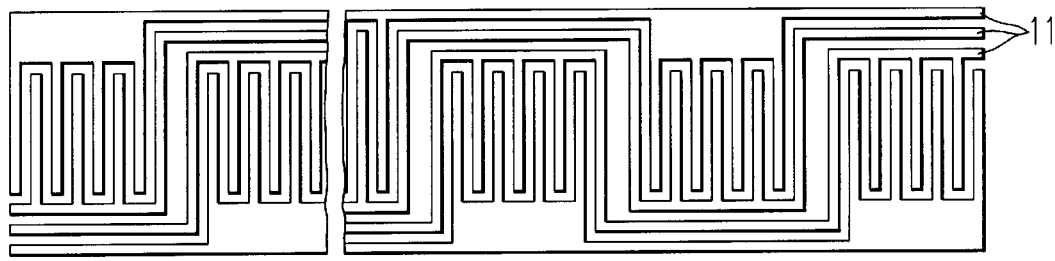
F I G. 18A
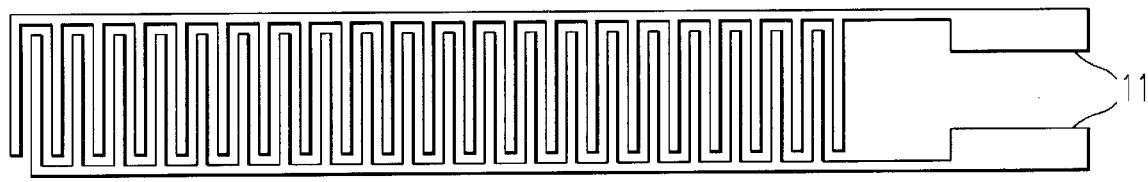
F I G. 18B
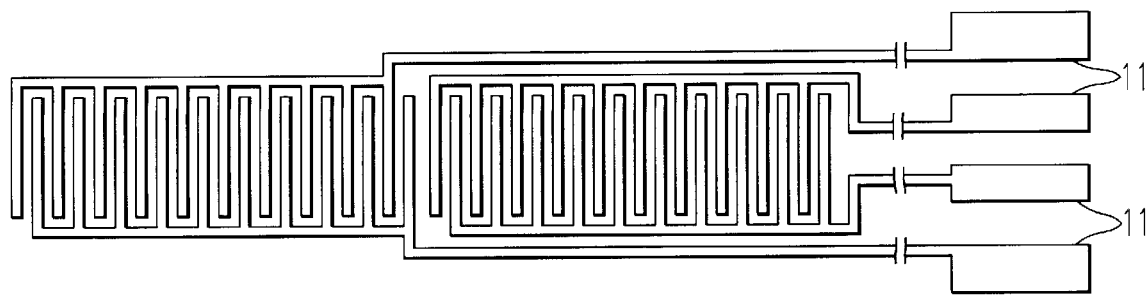
F I G. 18C

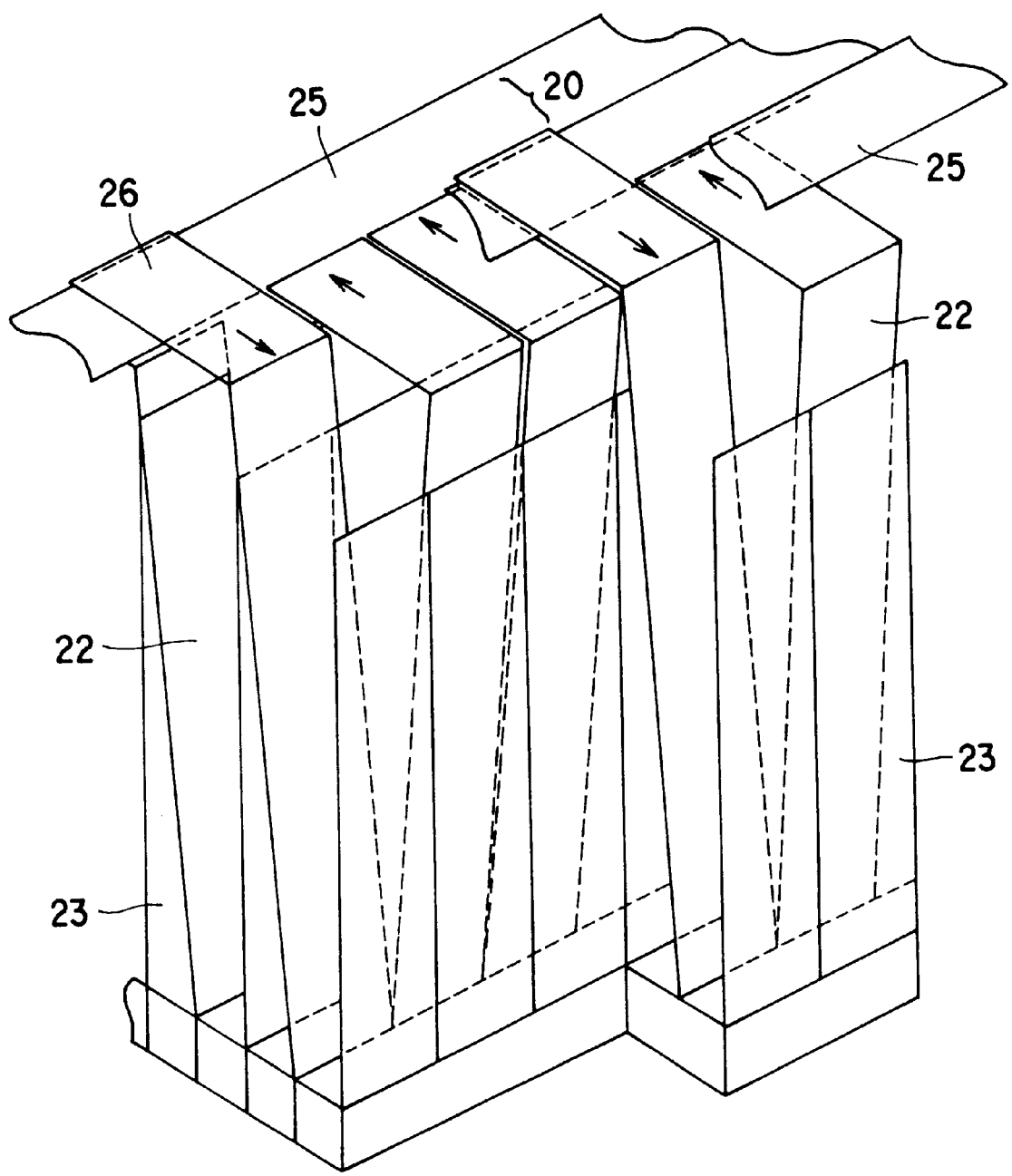
F I G. 24

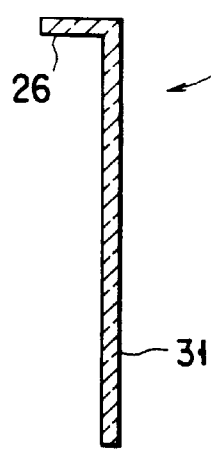
F I G. 33
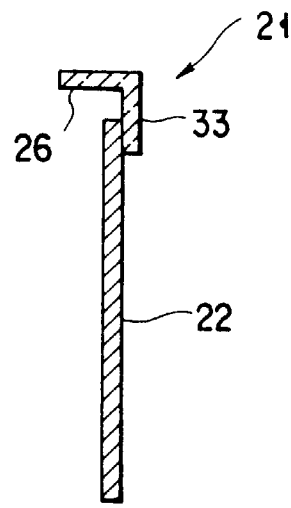
F I G. 34
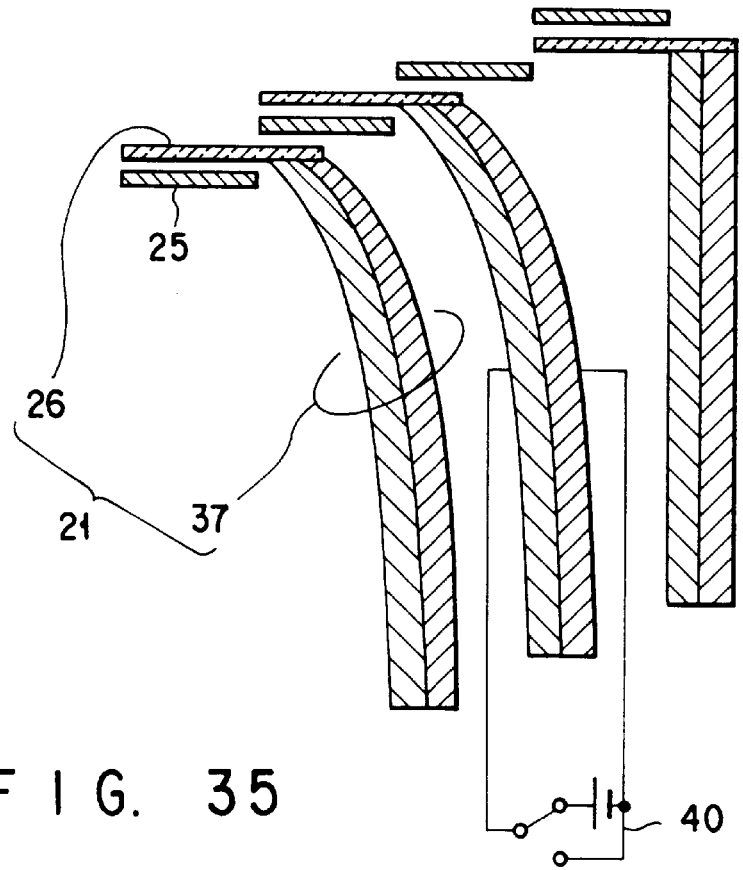
F I G. 35

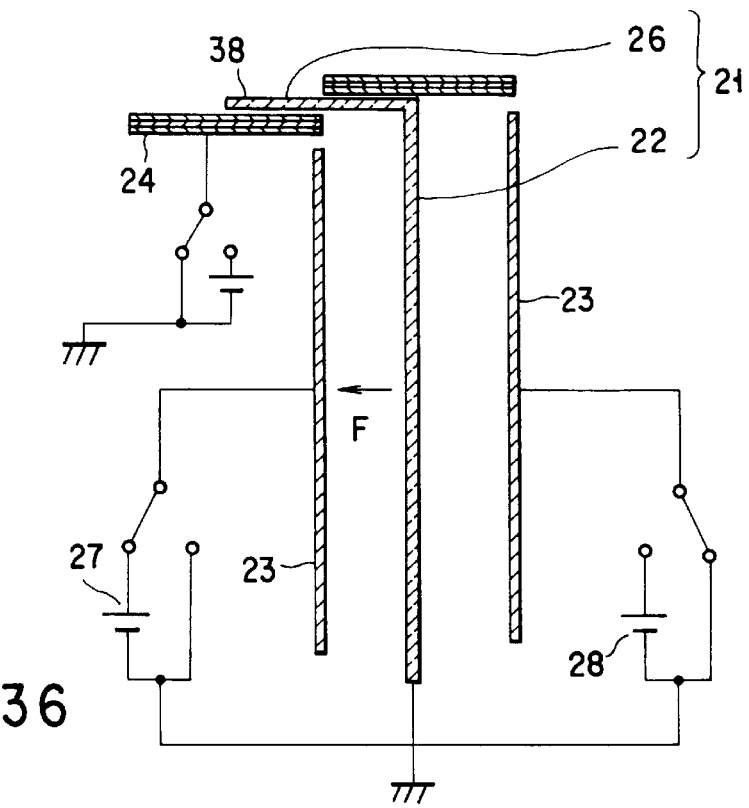
F I G. 36
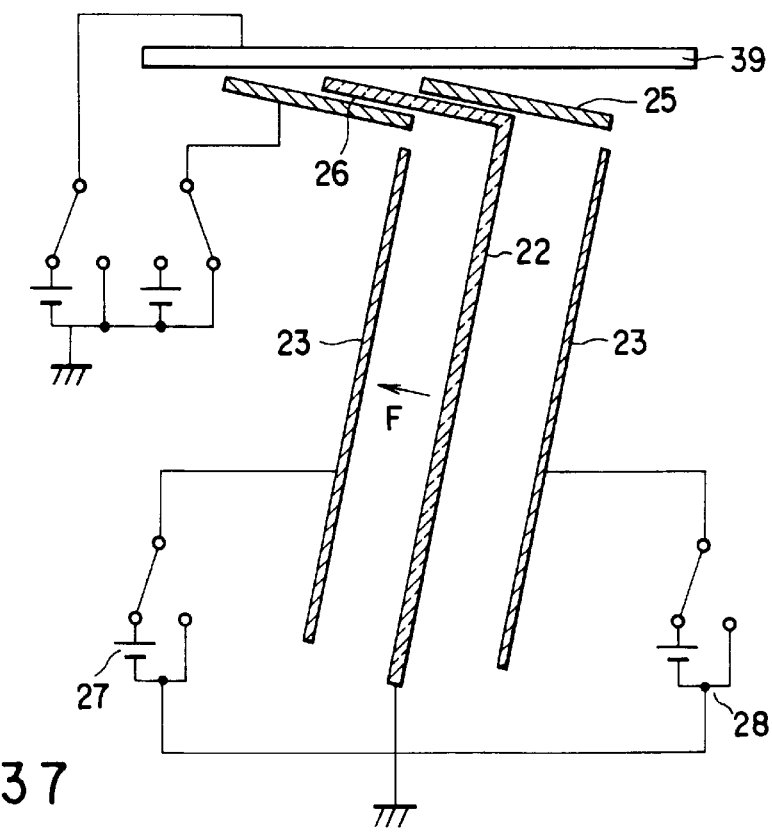
F I G. 37

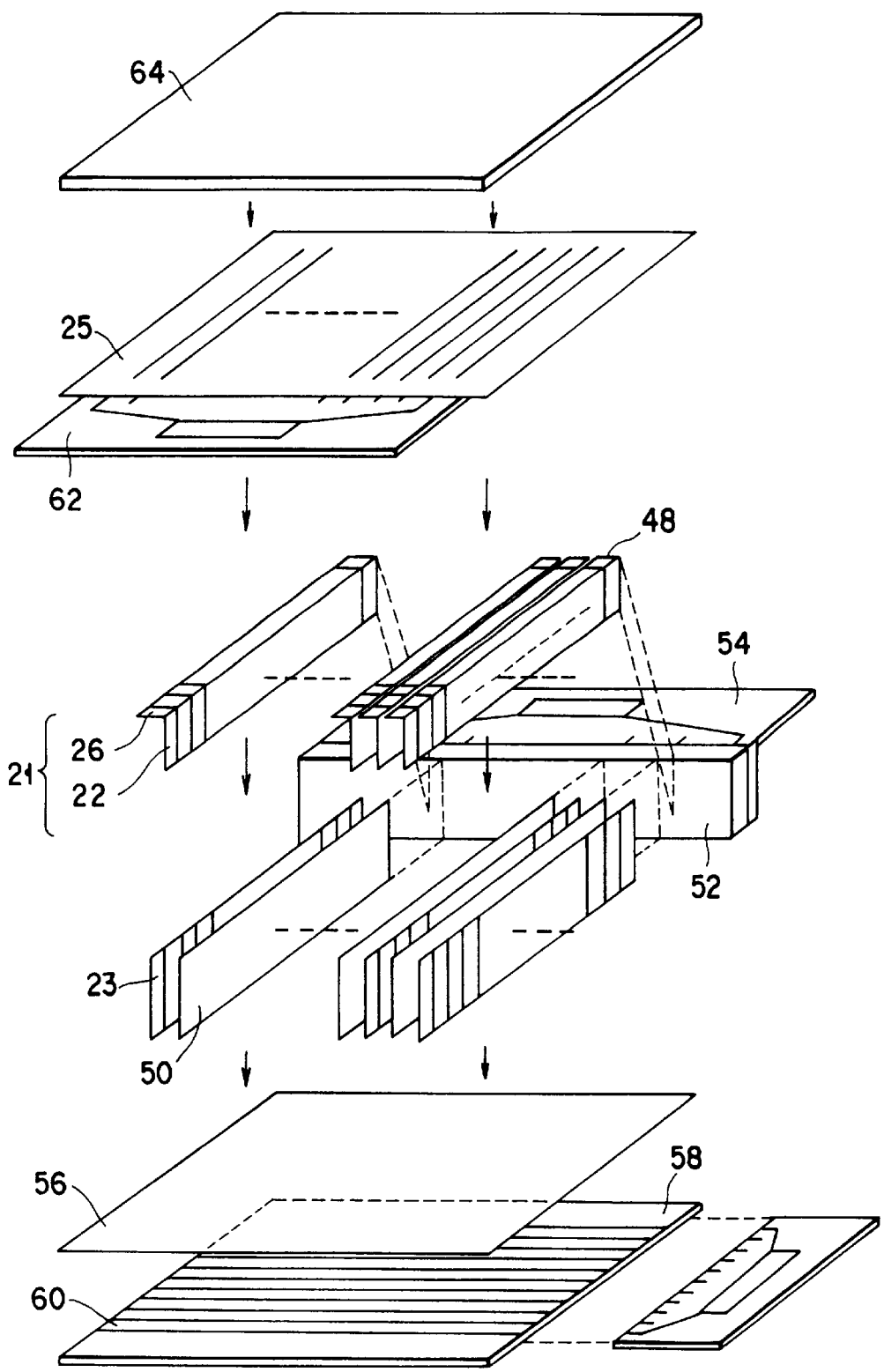
F I G. 38

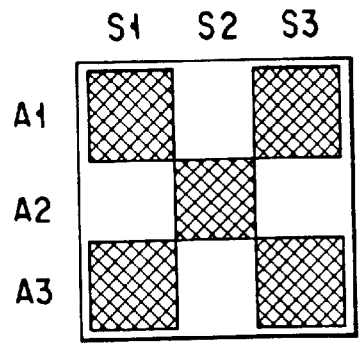
F I G. 41
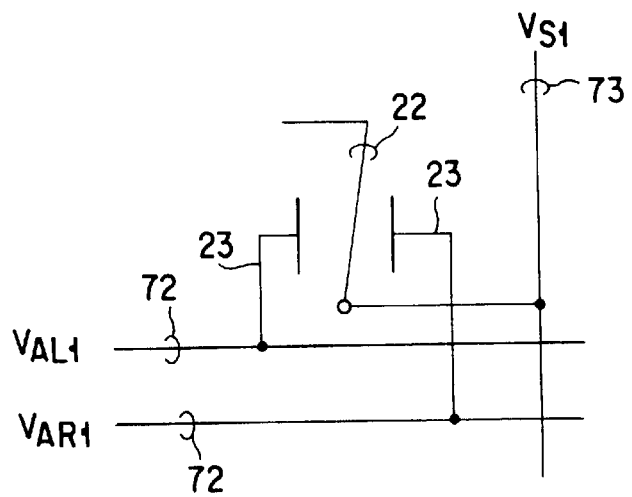
F I G. 42
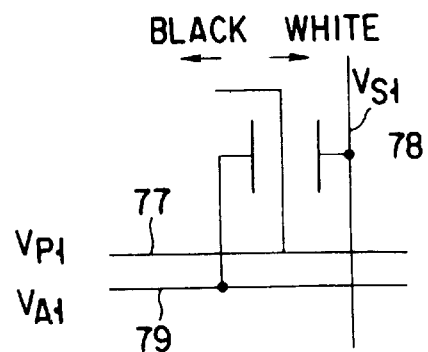
F I G. 45

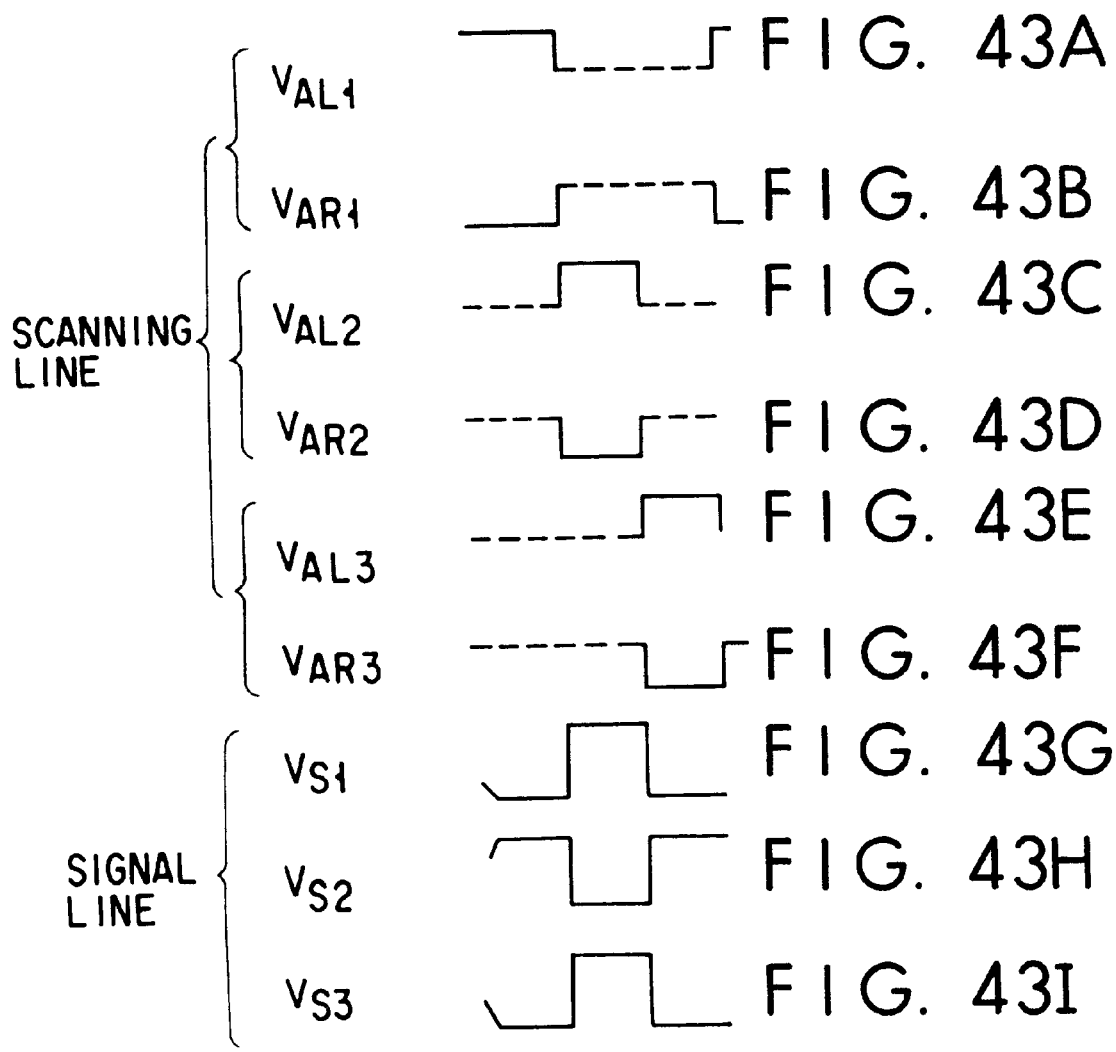

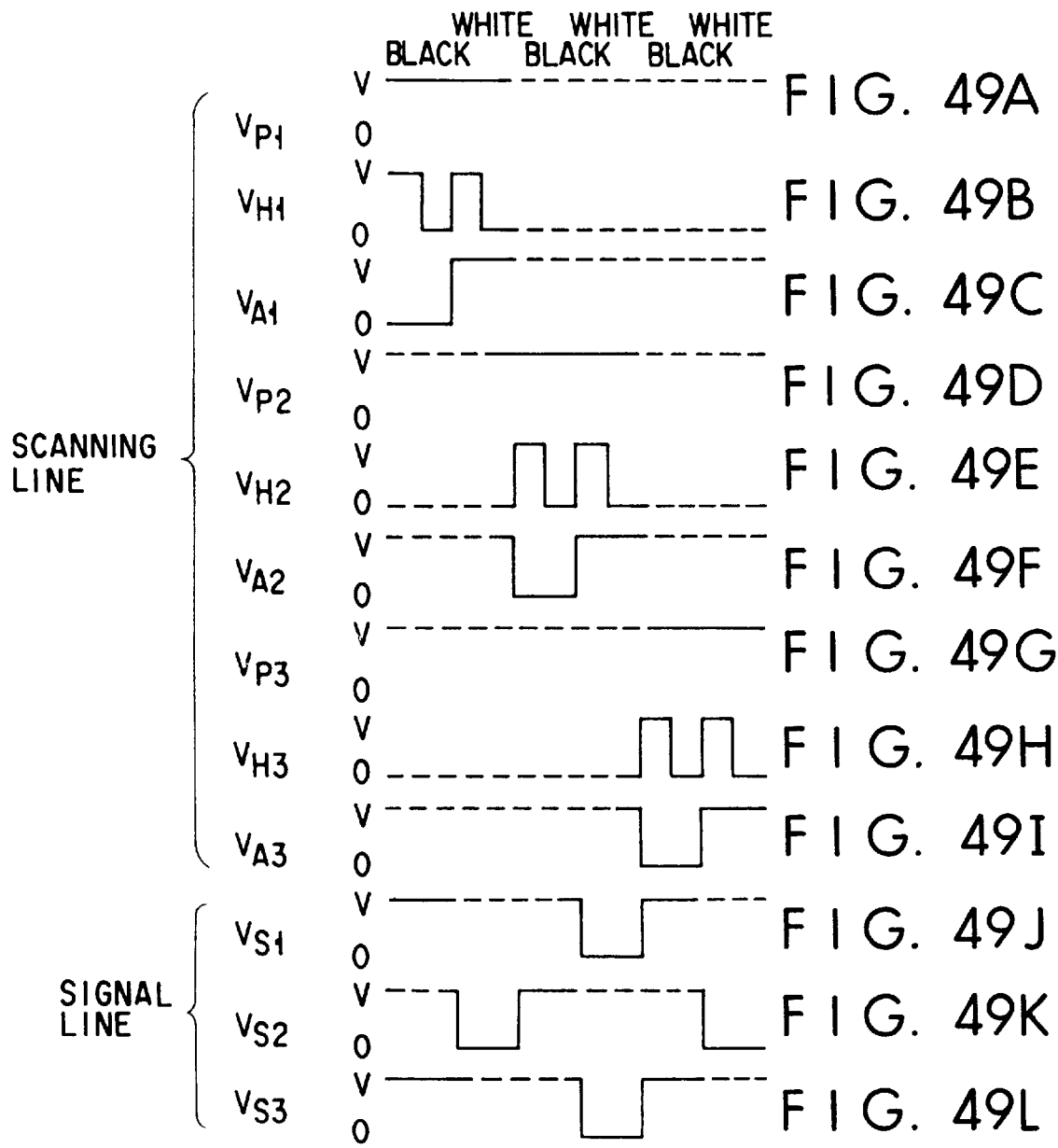

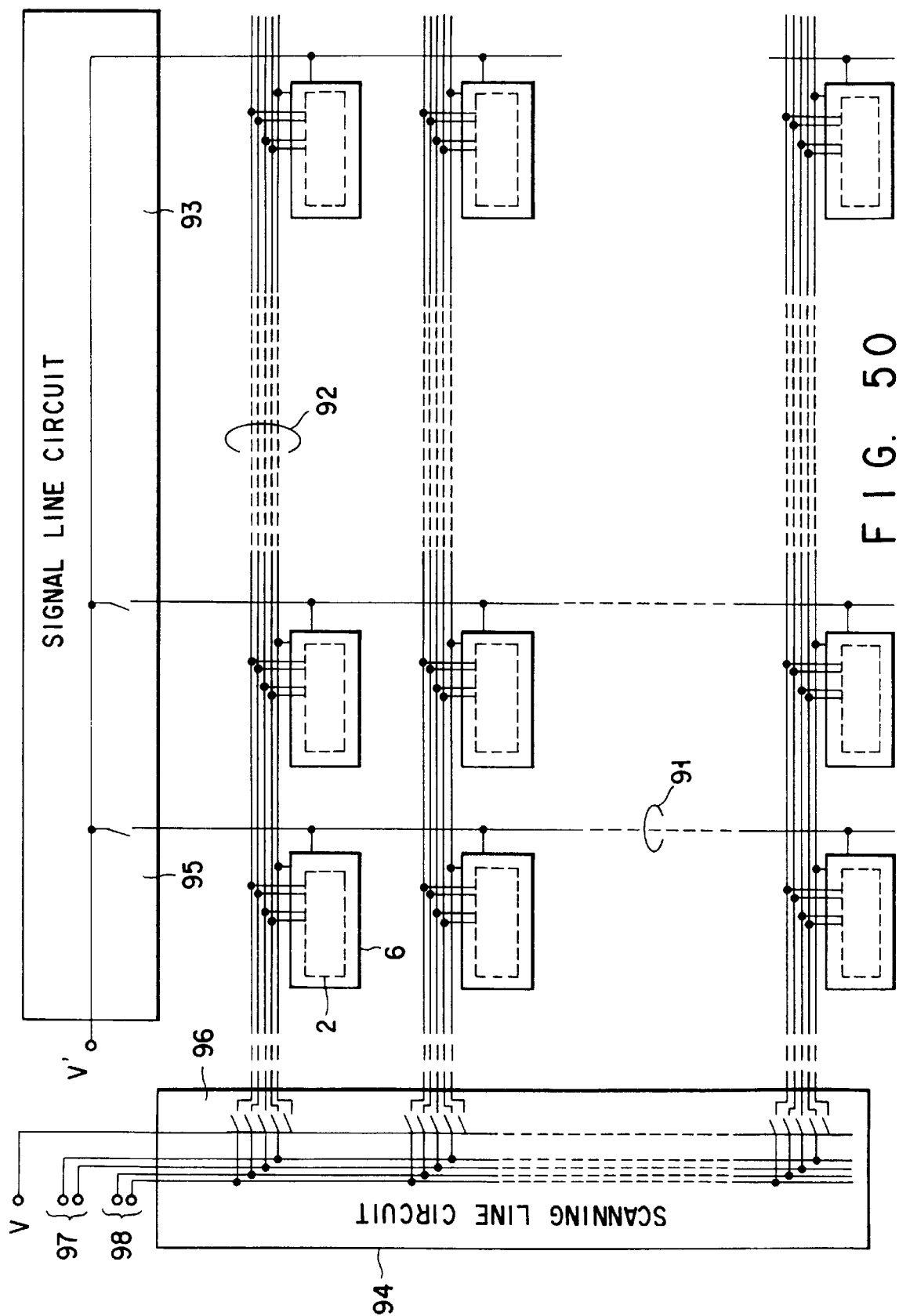
F I G. 50

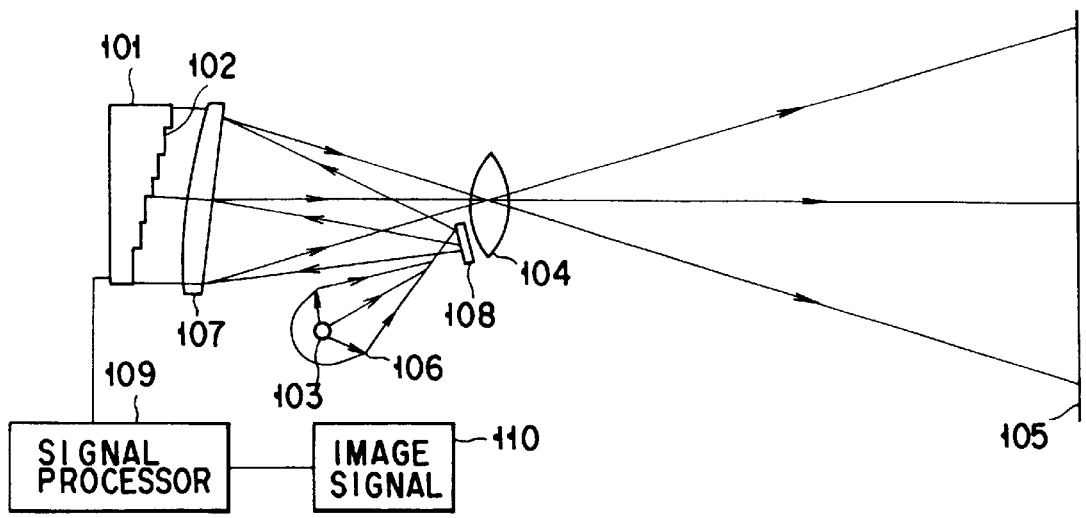
F I G. 51
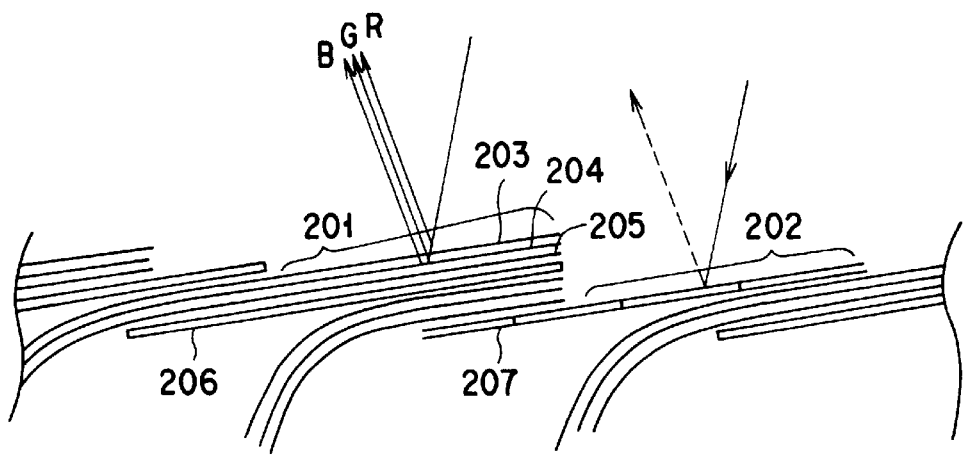
F I G. 52
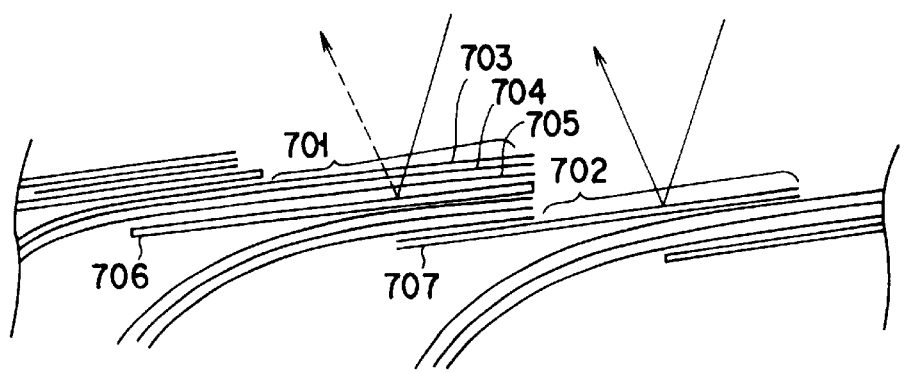
F I G. 54

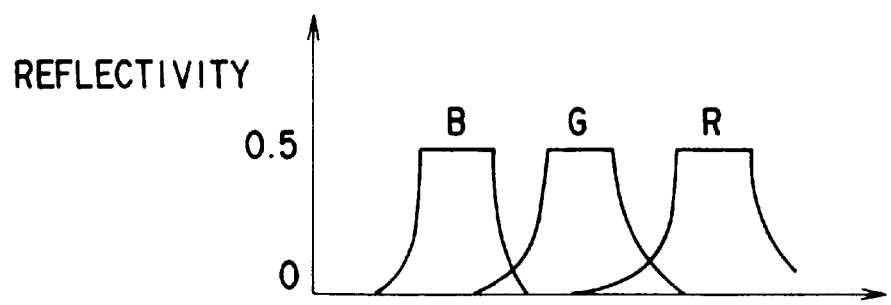
F I G. 59 A
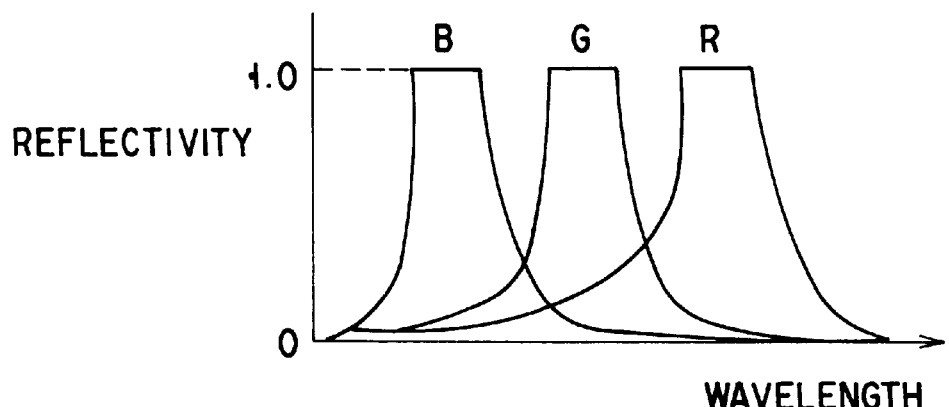
F I G. 59 B
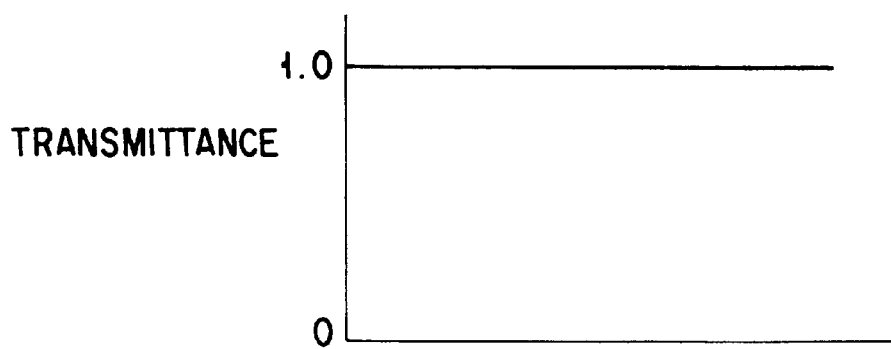
F I G. 59 C

DISPLAY DEVICE

BACKGROUND OF THE INVENTION

1. Field of the Invention

The present invention relates to a display device, and more particularly to a display device which has white plates arranged in a two-dimensional array so as to correspond to pixels and a plurality of colored films stacked on the white plates and which effects color display by adjusting the way these films are stacked to color pixels to a given color.

2. Description of the Related Art

Display devices for use with portable information processing apparatuses for which there has been an increasing demand, are required to be thin, lightweight, and less power-consuming. Liquid-crystal display devices, plasma display devices, and flat CRTs have been known as thin display devices. Of these, liquid-crystal display devices are the most suitable from the viewpoint of power consumption, the most important of the above three requirements, and have been widely put to practical use.

Display devices generally have the direct viewing type that allows a person to see the display screen directly and the projection type that projects the image onto a screen. The direct-viewing-type liquid-crystal devices have the transmission type that has a light source (a back light), such as a fluorescent lamp, built in at the back and the reflection type that makes use of ambient light. Since the former needs a back light, it is unsuitable for low power consumption design. Therefore, the latter, the reflection type, is the most suitable for the display device for portable information processing apparatuses.

In the reflection-type liquid-crystal display device, a twisted Nematic mode liquid-crystal display is placed on a reflection plate so that it is not necessary to provide a back light. Therefore, a power consumption thereof is lower than that of the transmission type.

Such a reflection-type liquid-crystal display device has the following display modes: the ECB (Electrically Controlled Birefrigence) mode, the GH (Guest Host) mode, and the TN (Twisted Nematic) mode.

When the ECB mode or the TN mode is used, a polarizing plate is required. Since a polarizing plate has a transmittance of about 40%, the light use efficiency is low.

When the GH mode is used, a polarizing plate is not needed. In this case, however, electrodes of ITO (Indium Tin Oxide) whose transmittance is about 90% are formed over a very wide area, so that the light use efficiency is not very high.

The low light use efficiency and the low aperture rate decrease the luminance, making the display image darker.

As described above, the reflection-type liquid-crystal display devices are most suitable for display devices for portable information processing apparatuses which are required to be small and less power-consuming. They, however, have the problem that they have a low light use efficiency and a low aperture rate decreases the reflection luminance, making the display image dark.

SUMMARY OF THE INVENTION

It is, accordingly, an object of the present invention to overcome the above-described disadvantages by providing an improved display device with a high luminance which is small, lightweight, and less-power-consuming.

Another object of the present invention is to provide an improved full-color display device with a high luminance which is small, lightweight, and less-power-consuming.

Still another object of the present invention is to provide an improved display device with a high luminance which is small, lightweight, and less-power-consuming and capable of providing paper white display.

Still further object of the present invention is to provide an improved display device with a high luminance which is small, lightweight, and less-power-consuming and consumes no electric power in displaying a still picture.

Still another object of the present invention is to provide a projection-type display device which can improve the light use efficiency as well as reduce the power consumption.

According to the present invention, there is provided a display device comprising a fixed section of a first color; a plurality of actuatable sections provided on the fixed section and corresponding to a plurality of pixels, the actuatable sections being of a second color; and driving means for shifting each of the plurality of actuatable sections by making use of electrostatic force.

According to the present invention, there is provided another display device comprising a fixed section of a first color; a plurality of actuatable sections provided on the fixed section and corresponding to a plurality of display pixels, the actuatable sections being of a second color; a plurality of supports for supporting the plurality of actuatable sections; and driving means for shifting the actuatable sections by bending the supports making use of electrostatic force.

According to the present invention, there is provided a further display device comprising a fixed section of a first color; a plurality of actuatable sections provided on the fixed section and corresponding to a plurality of display pixels, the actuatable sections being of a second color; a plurality of supports for supporting the plurality of actuatable sections; a plurality of piezoelectric elements provided on the plurality of supports; and driving means for shifting the actuatable sections by energizing the piezoelectric elements and thereby bending the supports.

According to the present invention, there is provided a still another display device comprising a plurality of fixed sections arranged in a two-dimensional matrix, the fixed sections being of a first color and corresponding to pixels; a plurality of actuatable sections provided on the plurality of fixed sections, the actuatable sections being of a second color; a plurality of supports for supporting the actuatable sections; and driving means for moving the actuatable sections by bending the supports by making use of electrostatic force.

According to the present invention, there is provided a method of manufacturing display devices, comprising the steps of forming a fixed-section composite member comprising a plurality of first-color fixed sections connected to each other and an actuatable-section composite member comprises second-color actuatable sections connected to each other which are laid on the fixed sections and can be moved from the fixed sections to expose the fixed sections; and arranging the fixed-section composite member and the actuatable-section composite member in an upright position alternately on a base substrate and placing a protective substrate on the tops of the fixed-section composite member and the actuatable-section composite member.

According to the present invention, there is provided a still another display device comprising a fixed section of a first color with a plurality of first electrodes, corresponding to a plurality of pixels; a plurality of actuatable sections provided on the fixed section and corresponding to the plurality of pixels, the actuatable sections being of a second color and having second electrodes; and driving means for shifting the plurality of actuatable sections by controlling polarities of the first and second electrodes and thereby generating electrostatic force, the polarity of the first electrodes and the polarity of the second electrodes being placed at a floating potential when the actuatable sections are not driven.

According to the present invention, there is provided a projection-type display device comprising a fixed section of a first color; a plurality of actuatable sections provided on the fixed section and corresponding to a plurality of pixels, the actuatable sections being of a second color; driving means for shifting the actuatable sections by making use of electrostatic force and thereby controlling colors of the pixels; and means for projecting an image of the pixels whose colors are controlled by the driving means.

With a display device of the present invention, actuatable films placed on a fixed section are moved by a driving section using electrostatic force and the films are used as a display section, on which an image displays. Since colored films are used to display the image, a polarizing plate is not needed. Furthermore, no electrode, such as ITO, is not formed in the display section, so that the light use efficiency becomes high. Because the driving section is formed so as not to impede the representation on the display image, the aperture rate becomes very high. As a result, the reflection luminance becomes high.

Furthermore, the display device of the invention has a display image memory function, so that there is no need of driving the device again unless the display remains unchanged, thus decreasing the power consumption.

Additionally, with the present invention, by setting the potential of the unselected scanning lines or signal lines to a floating-potential state, the capacitive load during driving can be decreased, thereby reducing the power consumption much more.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a schematic perspective view of a first embodiment of an actuatable-film display device according to the present invention;

FIGS. 7A and 7B show capacitors that generate film driving force;

FIG. 8 shows an arrangement of the electrodes of an actuatable film and a fixed film;

FIG. 9 is a waveform diagram of a film driving signal;

FIG. 11 is a flowchart showing the polarity applied to the electrodes in driving the film;

FIGS. 18A, 18B, and 18C are plan views of the patterns of the fixed and actuatable films of the first embodiment;

FIG. 24 is a perspective view of an actuatable film structure in the second embodiment;

FIG. 33 is a sectional view of still further example of an actuatable film in the second embodiment;

FIG. 34 is a sectional view of still further example of an actuatable film in the second embodiment;

FIG. 35 is a sectional view of still another example of an actuatable film in the second embodiment;

FIG. 36 is a sectional view of an example of the support electrode in the second embodiment;

FIG. 37 is a sectional view of another example of the support electrode in the second embodiment;

FIG. 38 is an assembly diagram showing the manufacturing processes in the second embodiment;

FIG. 41 shows a display example;

FIG. 42 shows an equivalent circuit of an pixel in the driving circuit of FIG. 40;

FIG. 43 is a waveform diagram of the driving signal in the driving circuit of FIG. 40;

FIG. 45 shows an equivalent circuit of an pixel in the driving circuit of FIG. 44;

FIG. 49 is a waveform diagram of the driving signal in the driving circuit of FIG. 47;

FIG. 50 is a circuit diagram of a display module according to a third embodiment of the present invention;

FIG. 51 shows a schematic configuration of a projection-type display device according to a fourth embodiment of the present invention;

FIG. 52 is a sectional view of the display module of the fourth embodiment;

FIG. 54 is a sectional view of the display module in a projection-type display device according to a fifth embodiment of the present invention;

FIGS. 59A, 59B, and 59C show the reflection and transmission characteristics of the actuatable film in the display module of the seventh embodiment.

DETAILED DESCRIPTION OF THE PREFERRED EMBODIMENTS

Figure 2:
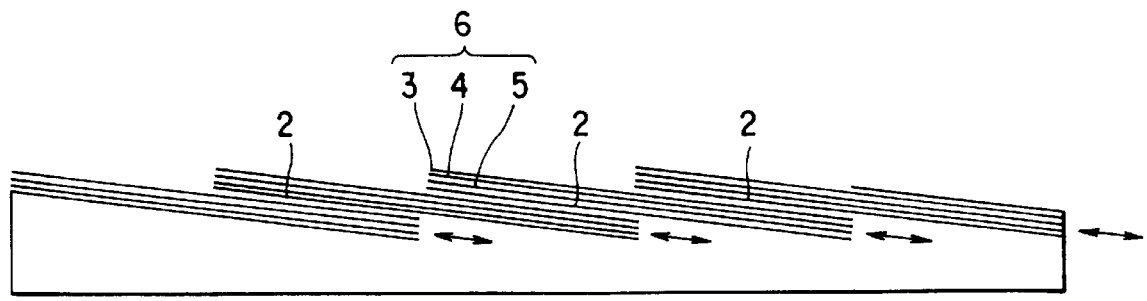
FIG. 2 is a schematic sectional view of the first embodiment of the display device.
Figure 3:
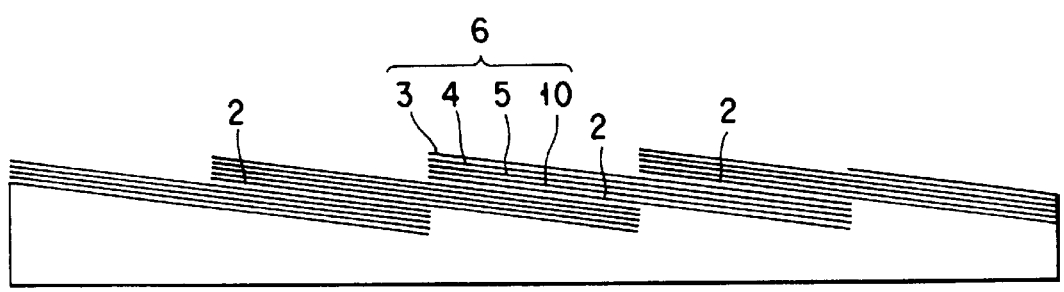
FIG. 3 is a schematic sectional view of a modification of the first embodiment.

A preferred embodiment of a display apparatus according to the present invention will now be described with reference to the accompanying drawings.

First Embodiment

FIG. 1 is a perspective view of an actuatable film display device according to a first embodiment of the present invention, showing the internal configuration. Over the top of a substrate 1, fixed sections 2 are arranged in rows. The fixed sections 2 are attached to the right and left sidewalls (not shown in FIG. 1). The fixed sections 2 are provided so as to overlap with one another a little obliquely as shown in the side view of FIG. 2. The fixed section 2 in each row has its proximal side located under the fixed section in the immediate preceding row. The fixed sections 2 are formed of a white opaque film with a reflectivity as high as at least the reflectivity of paper white. On the fixed section 2, a cyan transparent film 3, a magenta transparent film 4, and a yellow transparent film 5 are stacked. The distal ends of these three colored films 3, 4, 5 are free ends, which align with the distal end of the fixed film 2. The proximal ends of the three colored films 3, 4, 5 are secured to the substrate 1 so that the distal end thereof can be moved toward or away from the proximal end thereof. The three colored films 3, 4, 5 constitute an actuatable film 6.

The exposed portion indicated by numeral 7 on the fixed portion 2 in the actuatable film 6 corresponds to a pixel. In the portions other than the pixel portion 7 (the portions hidden under the adjacent fixed portion 2) in the actuatable film 6, a driving section 8 made up of comb-shaped electrodes and a wiring section 9 that wires the leads from the driving section 8 are formed. Although not shown in FIG. 1, in the fixed section 2, too, a driving section and a wiring section are formed in the portion corresponding to the driving section 8 and the wiring section 9 of the actuatable film 6. By controlling the polarity of the comb-shaped electrodes of the actuatable film 6 and the fixed section 2, electrostatic force is generated between the fixed section 2 and the actuatable film 6. The actuatable film 6 is moved by the electrostatic force and the distal end of the actuatable film 6 is housed under the adjacent fixed section 2, thereby enabling the way the color films 6 overlap on the pixel to be changed. The coloring of a pixel can be adjusted, depending on how far which of the three colored films is moved.

When the size of the display screen is 17 inch or less, it is desirable that the size (width or length) of pixel should be about 40 to 300 $\mu$m, because a sufficient number of pixels can be secured. Further-more, it is desirable that the thickness of each of transparent film 3, 4, 5 should be such that a person can sense no bump when seeing the film. Specifically, the film thickness is preferably about 1 to 200 $\mu$m.

Furthermore, to absorb a distortion caused when the actuatable film 6 moves, the wiring section 9 has a suitable length. Specifically, the wiring section 9 is preferably about 5 mm to 2 cm long.

Additionally, when the electrostatic force is used, it is possible to move the actuatable film 6 at about 4 mm/sec. In the case of the 9.5-inch size, the power consumption is about 1.3 W in displaying a moving picture. The smaller the number of times the image is changed, the lower the power consumption.

FIG. 2 is a schematic sectional view of the AFD (actuatable film display) device. In FIG. 2, a driving section 8 and a wiring section 9 are omitted for the sake of simplification. Transparent actuatable films 3, 4, 5 of three colors, cyan, magenta, and yellow are stacked on a white opaque fixed film 2. Further on the stacked films, a fixed film 2 and actuatable films 3, 4, 5 of a similar structure are placed like a stair in such a manner that they are shifted by the pixel portion. By moving the actuatable films 3, 4, 5 color by color separately in the direction shown in the figure, multicolor display can be effected on a pixel basis. For example, when the magenta and yellow films are left on the white film, red can be displayed; when the cyan and yellow films are left, green can be displayed; when the magenta film is left, blue can be displayed; and when all of the cyan, magenta, and yellow films are left, black can be displayed, so that multicolor display of eight colors can be effected.

To display half-tone colors other than the eight colors, one or some of the actuatable films are moved within a pixel by the amount corresponding to the desired half-tone color, not by a full one pixel, thereby enabling multicolor display of more than eight colors by area gradation.

Furthermore, to make black display clear, a black opaque film 10 may be laid as an actuatable film on the three colored actuatable films 3, 4, 5 to provide four layers of actuatable films.

Figure 4:
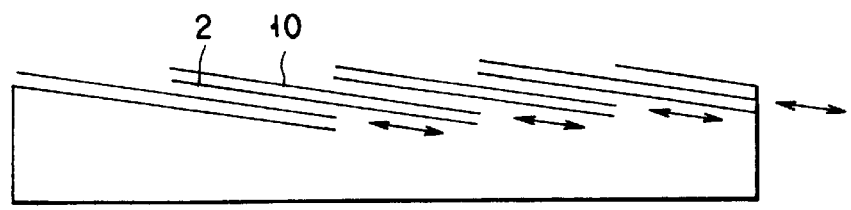
FIG. 4 is a schematic sectional view of another modification of the first embodiment.

To provide monochromatic display, not color display, only a black opaque film 10 is laid on the white fixed film 2 as shown in FIG. 4.

Figures 5, 6:
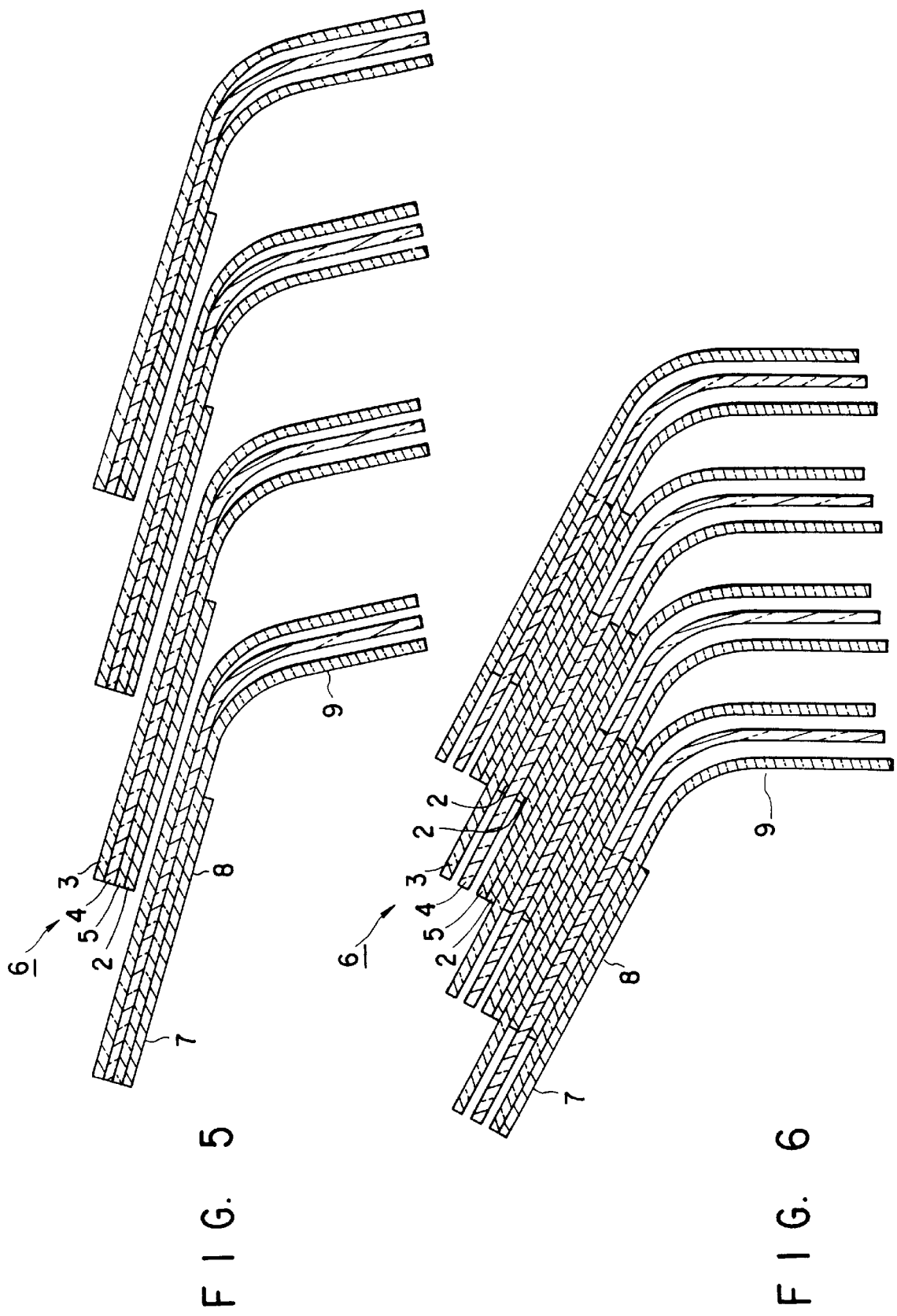
FIG. 5 is a sectional view of a detailed arrangement of actuatable films and fixed films forming pixels of the first embodiment.
FIG. 6 is a sectional view of a detailed arrangement of actuatable films and fixed films forming pixels in a modification of the first embodiment.

The cross-sectional structure is shown in more detail in FIGS. 5 and 6. As described above, a cyan, magenta, and yellow transparent films 3, 4, 5 are determined to be an actuatable film 6. The black film 10 may be included in the actuatable film 6. Although a color is basically given to the display section only, the entire film including the driving section and the wiring section may be colored. As for a method of coloring the film, a colorless, transparent film may be colored or dyed, or dye may be mixed into the pellets before a film is formed. In addition to the abovedescribed subtractive primary colors, black, white, and the additive primary colors (red, green, blue) may be used.

FIG. 5 shows the case where an actuatable film 6 composed of transparent films 3, 4, 5 and a fixed film 2 are stacked alternately, as shown in FIGS. 1 and 2. A method of driving this film will be explained later.

FIG. 6 shows the case where the individual actuatable films 3 to 5, and a fixed film 2 are stacked alternately. As shown in FIG. 6, by providing fixed films above and below each transparent actuatable film, the transparent films can be moved one by one easily. This type of actuatable film, however, has the disadvantage that the display section gets thicker, so that the present invention improves a driving method in such a manner that the transparent films can be moved one by one even if fixed films are provided above and below the entire actuatable film 6 as shown in FIG. 5.

A method of manufacturing actuatable films will be explained. First, colored films with a thickness of 1 to 200 $\mu$m, including a cyan film, a magenta film, a yellow film, and a black film, are prepared. These films are used as base films. Desirable materials are polyester and polyimide in terms of electrical characteristic and ease of manufacturing.

On the film, a single layer of any one of copper, aluminum, chromium, tantalum, tungsten, molybdenum, indium tin oxide, and carbon, or a laminated film of some of these substances, or an alloy film is formed by spattering or evaporation. Then, a pattern of a specific shape is formed by lithographic techniques or photo engraving processing. The pattern thus formed is a comb-shaped electrode.

Thereafter, on the substance, an insulating film is formed by anodic oxidation, spattering, evaporation, spin coating, dipping, printing, or lamination. The insulating film is called a cover film. The materials for the insulating film include a silicon oxide film, a silicon nitride film, a silicon carbide film, tantalum oxide, aluminum, zinc titanate zirconate, barium titanate, polyester, polyimide, polyurethane, and polyepoxy. A film formed of one of the above materials with adhesive may be laminated. In the case of a thermoplastic resin film, the base film and the cover film can be bonded together without adhesive.

To manufacture white opaque films, magnesium oxide or barium sulfate may be applied by sputtering. This provides a complete diffusion plate with a reflectivity of 100% and a very bright display device with a light use efficiency of 100% can be produced.

The fixed section may be formed of a thicker thing instead of a film.

On the film thus manufactured, Teflon (trade mark) or ultra-high-molecular-weight polyethylene is applied to improve resistance to wear.

A method of driving the actuatable film will be explained. Use of electrostatic force for driving is the most effective in making the device smaller and more lightweight.

As for a method of utilizing electrostatic force, for example, in a capacitor constructed as shown in FIG. 7A, when the electrodes are shifter from each other as shown in FIG. 7B, electrostatic force develops in the horizontal and vertical directions. By inserting a suitable insulating film between the electrodes of the capacitor, only the horizontal force can be extracted and used as driving force for a film. Since the vertical force increases the frictional force between the actuatable film and the fixed film, it must be made as small as possible. If the electrostatic capacity of a capacitor is C, the applied voltage is V, the distance (gap) between the electrodes of the capacitor is d, the permittivity of a dielectric in the capacitor is $\epsilon$, the electrode width is W, the electrode length is L, and the horizontal displacement of the electrode is X, the electrostatic energy U will generally be expressed as:

$$U = CV^2/2$$

The vertical force Fd will be expressed as:

$$Fd = -\partial U / \partial d \qquad (1)$$
$$= -(V^2/2) \partial C / \partial d$$
$$= V^2 \varepsilon (W - X) L / 2d^2$$

The horizontal force Fx will be expressed as:

$$Fx = \partial U / \partial x \qquad (2)$$
$$= (V^2/2) \partial C / \partial x$$
$$= V^2 \varepsilon L / 2d$$

The vertical force is inversely proportional to the square of the distance between the electrodes d and the horizontal force is inversely proportional to d. Therefore, if d is made larger to some extent, the horizontal force will overcome frictional force, imposing force so that the capacity of the capacitor may increase and causing the film to move. To drive the film continuously, the polarity of the electrodes must be switched one after another.

Furthermore, because the alignment of the upper and lower electrodes makes the horizontal force insufficient, it is necessary to provide a two-phase structure as shown in FIG. 8, which has an area where the electrodes of the fixed section 2 do not align with the electrodes of the actuatable film 6 (a second phase II) and an area where the electrodes of the fixed section align with the electrodes of the actuatable film (a first phase I). It is desirable that the waveform of voltage V applied to these electrodes 11 should be such that the first phase is shifted from the second phase by a quarter of a period. By applying such a voltage, the actuatable film 6 can be driven in the direction of arrow or in the opposite direction. The movement direction of the actuatable film 6 can be set to either the right or the left, depending on which of the first and second phases is advanced first. While in FIG. 8, the electrode 11 of the fixed film 2 has a two-phase structure, the electrode 11 of the actuatable film 6 may have a two-phase structure instead.

To obtain great force, the electrodes 11 of FIG. 8 may be arranged in parallel. It is desirable that the adjacent electrodes 11 should have the opposite polarity to each other. The reason is that in this case, the amount of change in the electrostatic energy or the amount of change in the electrostatic capacity becomes larger than when the adjacent electrodes have the same polarity, with the result that the generate force is greater.

The waveform of the voltage applied to the fixed film 2 and the actuatable film 6 is composed of a preceding wave and a succeeding wave, as shown in FIG. 9. Depending on which of the first and second phases is determined to be the preceding wave or the succeeding wave, the movement direction can be set to either the right or the left in FIG. 8.

Figure 10:
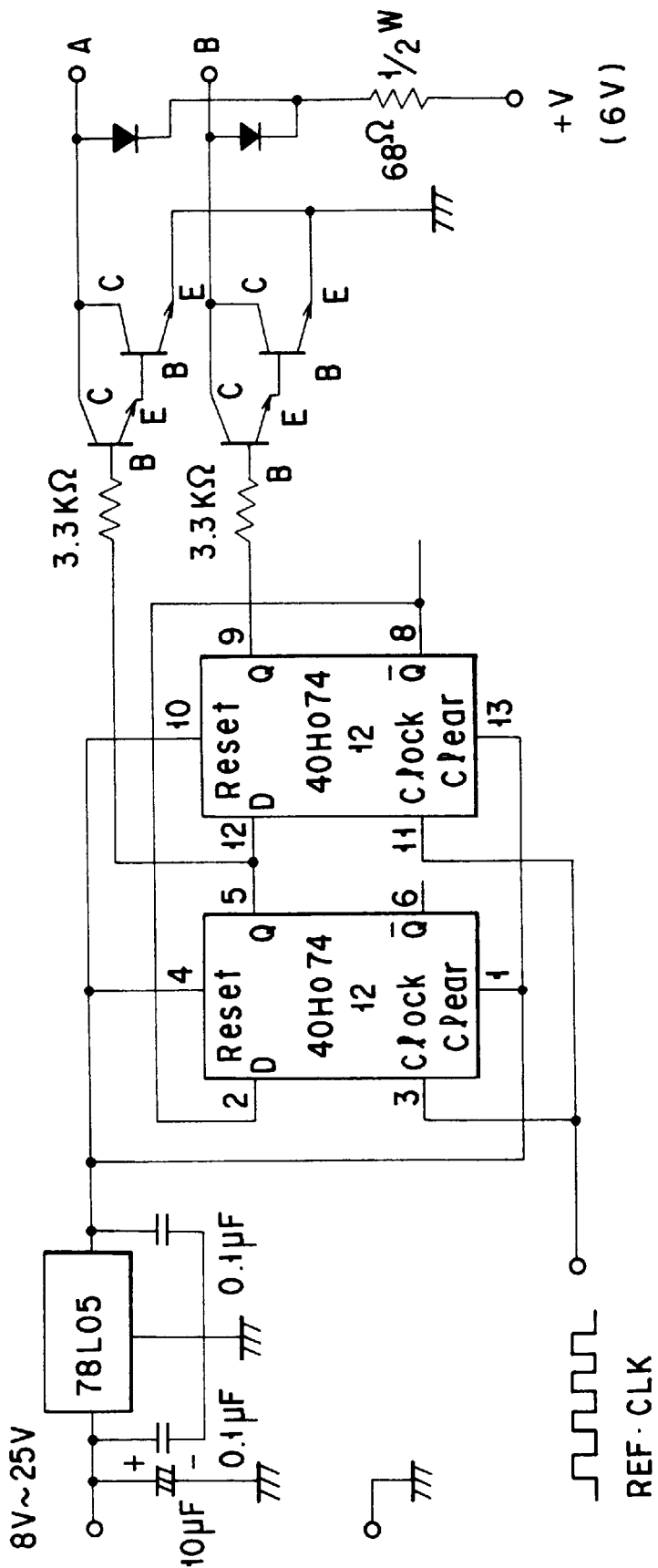
FIG. 10 is a circuit diagram of a driving signal generating circuit.

FIG. 10 is a circuit that produces driving signals for the preceding wave and the succeeding wave shown in FIG. 9. In the figure, a driving signal is supplied from output terminals A and B. It is desirable that the driving signal should be supplied to the driving power supply via a photo MOS relay to separate the power supply for applied voltage from the waveform generating section. To control the movement of the actuatable film completely, a desired number of pulses should be sent from the pulse generator with a counter circuit to the waveform generating section, instead of a basic clock being generated from a function generator.

FIG. 11 is a flowchart for the polarity of electrodes to drive the actuatable film. The polarity of electrodes is switched in the order of steps I to IV. In the figure, the active phase is a phase that is generating driving force.

Figure 12:
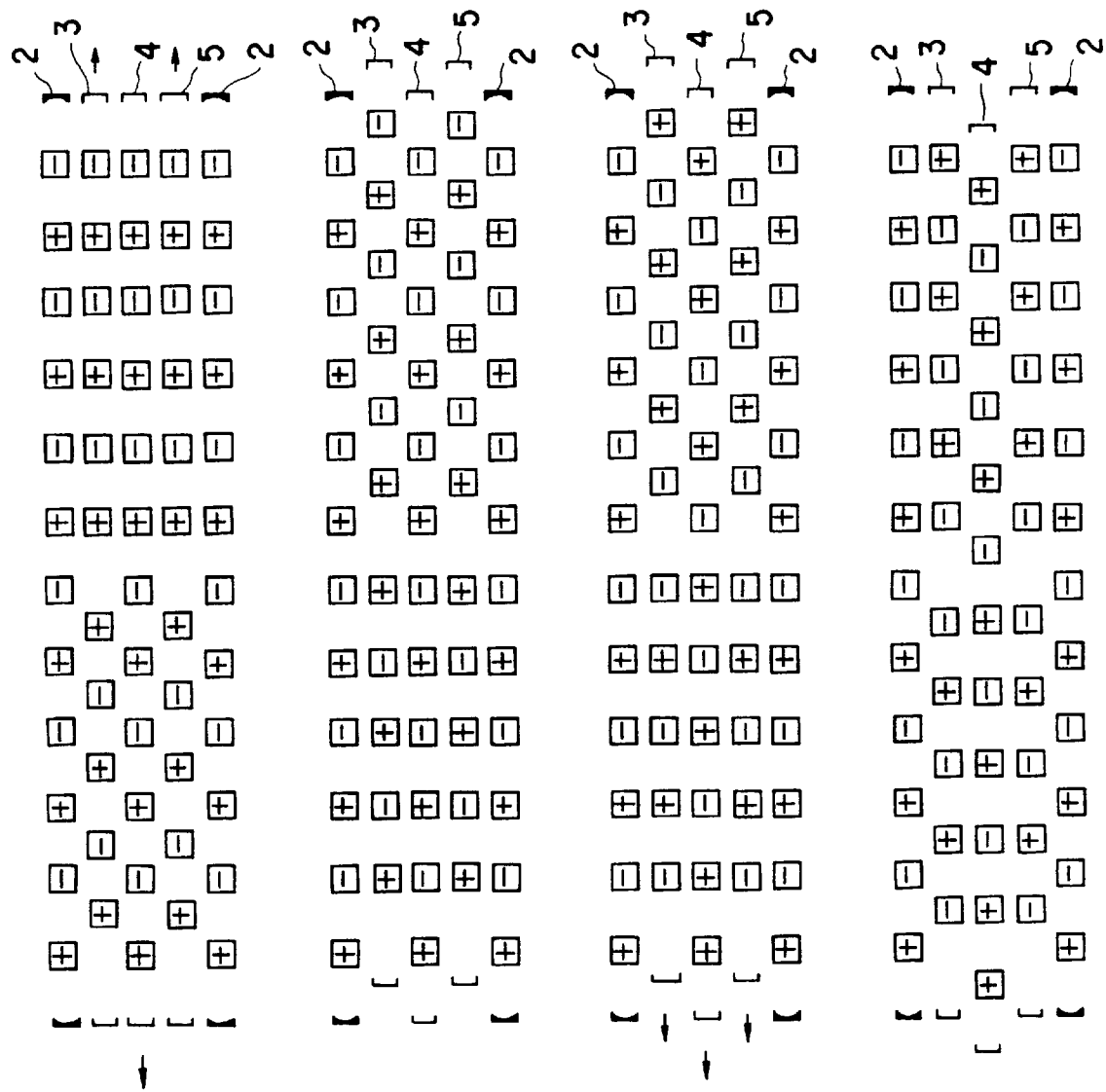
FIG. 12 is a flowchart for a detailed example of driving the film.
Figure 13:
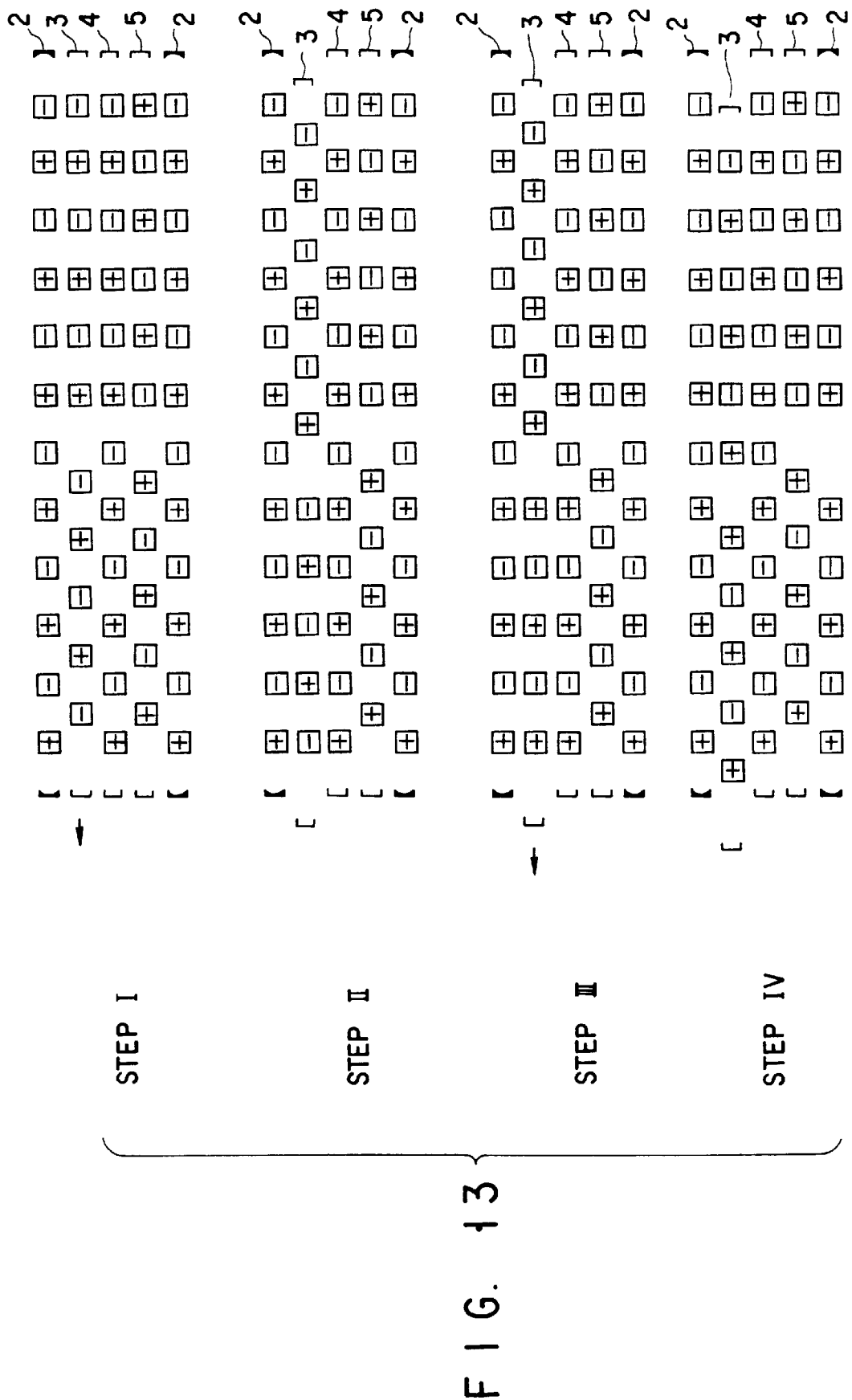
FIG. 13 is a flowchart for another detailed example of driving the film.

Here, a method of driving the individual transparent films 3 to 5 in the case where three actuatable films, or four films including a black film, are sandwiched between two fixed films as shown in FIG. 5 will be explained with reference to FIGS. 12 and 13. In FIGS. 12 and 13, only the arrangement of the polarity of electrodes is shown.

FIG. 12 shows the case where only the magenta actuatable film 4, the middle of the three films, is moved. First, the polarity of electrodes is set as shown in step I. Then, by switching the polarity of electrodes in the order of steps II to IV, only the magenta film 4 can be moved to the left by a half of the electrode pitch.

FIG. 13 shows the case where only the cyan actuatable film 3, the top of the three films, is moved. First, the polarity of electrodes is set as shown in step I. Then, by switching the polarity of electrodes in the order of steps II to IV, only the cyan film 3 can be moved to the left by a half of the electrode pitch.

As shown in FIGS. 12 and 13, the actuatable film is worked as the fixed film when it is not to be moved. In this way, an arbitrary one of the actuatable films can be moved separately with less number of fixed films. By setting the electrode pitch smaller than the pixel pitch, the movement can be controlled more precisely than the pixel pitch and gradation display can be effected by an area gradation scheme. As a result, the number of fixed films can be reduced, providing a desirable configuration for realizing a thin display device.

FIGS. 14 to 17 show the cross section of the actuatable film and the fixed film in more detail. Reference symbol P indicates the electrode pitch, W represents the electrode width, and d denotes the gap between facing electrodes. Basically, P=2W is preferable from the above-describe capacitor theory.

Figure 14:
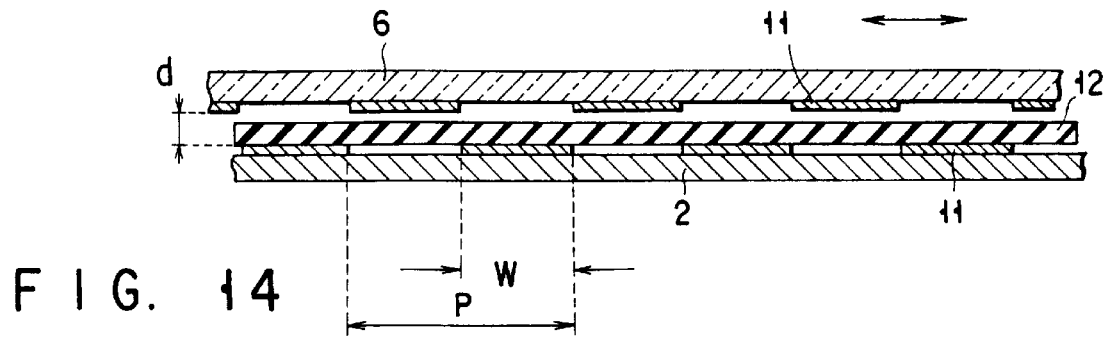
FIG. 14 is a detailed sectional view of an actuatable film and a fixed film in the first embodiment.

FIG. 14 shows the case where an insulating film 12 is laid on the fixed film 2 with electrodes 11 located on both sides of the insulating film 12. The insulating film 12 may be laid on the actuatable film 6 instead of the fixed film 2. This holds true in the examples in FIGS. 15 to 17.

Figure 15:
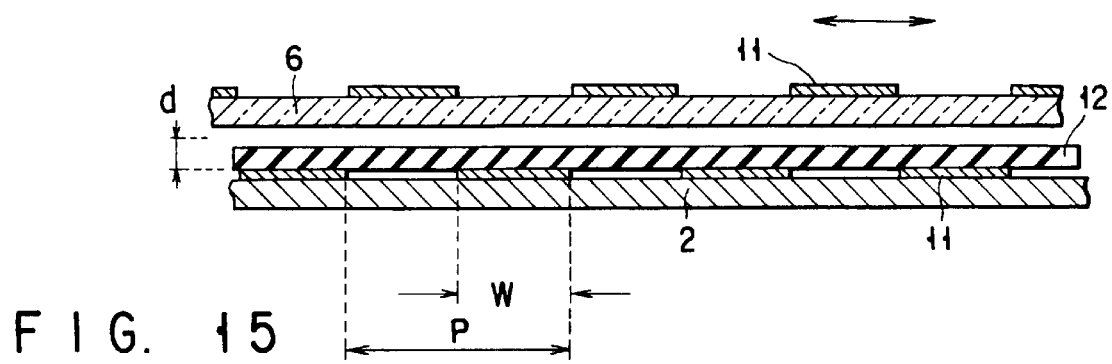
FIG. 15 is a detailed sectional view of an actuatable film and a fixed film in a modification of the first embodiment.

FIG. 15 shows the case where the insulating film 12 is laid on the fixed film 2 with the electrodes 11 located on one side of the insulating film 12. Although in the figure, the electrodes 11 of the fixed film 2 are provided on the insulating film 12 side, the electrodes 11 of the actuatable film 6 may be provided on the insulating film 12 side.

Figure 16:
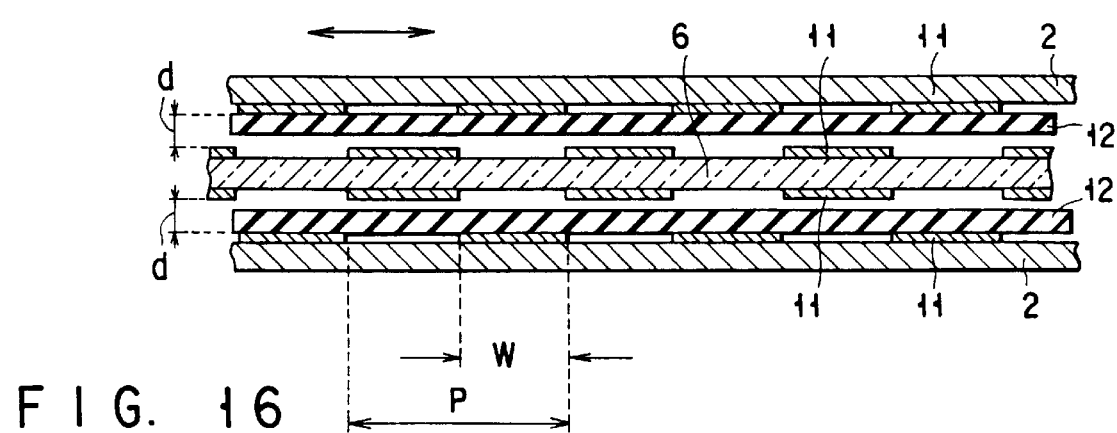
FIG. 16 is a detailed sectional view of an actuatable film and fixed films in another modification of the first embodiment.

FIG. 16 shows the case where the electrodes 11 are formed on the upper side and the lower side of one or both of the fixed film 2 and the actuatable film 6. The insulating film 12 is laid on one or both of the fixed and actuatable films. Here, the insulating film 12 is provided on the fixed film 2 side.

Figure 17:
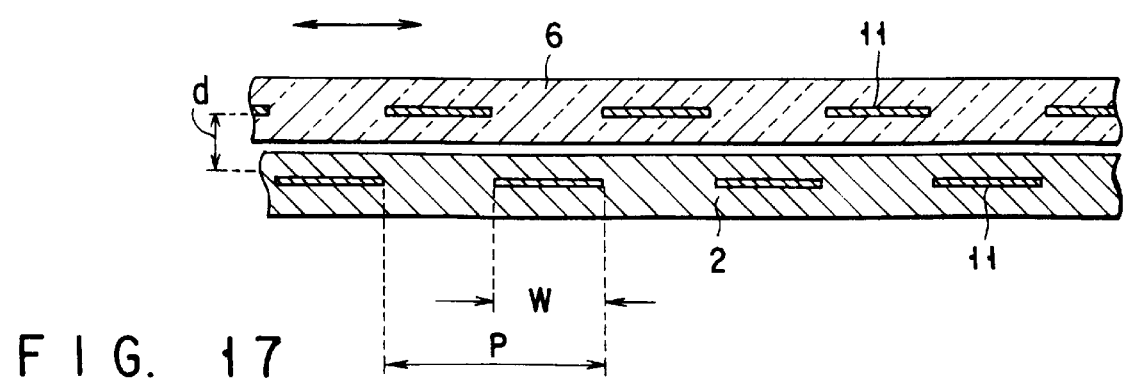
FIG. 17 is a detailed sectional view of an actuatable film and a fixed film in a still another modification of the first embodiment.

FIG. 17 shows the case where the electrodes 11 are embedded in a film or sandwiched between thermoplastic films of the same type and bonded together by thermocompression.

The plane pattern of the electrode 11 will be explained. A pattern where the pitch of electrodes 11 varies in the middle as shown in FIG. 18A and a pattern where the pitch of electrodes 11 remains unchanged as shown in FIG. 18B are combined into a pair, with one as the upper pattern and the other as the lower pattern. This realizes a two-phase structure that has an area where the electrodes 11 align with each other and an area where the electrodes do not align with each other as shown in FIG. 8. Furthermore, a structure as shown in FIG. 18C may be used instead.

The structure of the driving circuit of the display device will be explained. In an example shown in FIG. 19, a voltage is supplied to a the fixed film 2 via scanning lines 14 connected to a scanning line circuit 13. A voltage is supplied to the actuatable film 6 via signal lines connected to a signal line circuit 15. Basically, only when a voltage is applied to both of the actuatable film 6 and the fixed film 2, the actuatable film 6 can be moved. By combining the fixed film 2, scanning lines 14, actuatable film 6, and signal lines 16 into a matrix, a two-dimensional image can be displayed. Normally, the scanning lines 14 are scanned one by one, starting at the top. By sending a voltage waveform to several scanning lines 14 in a similar manner to active addressing, an image can be displayed at high speeds.

Figure 19:
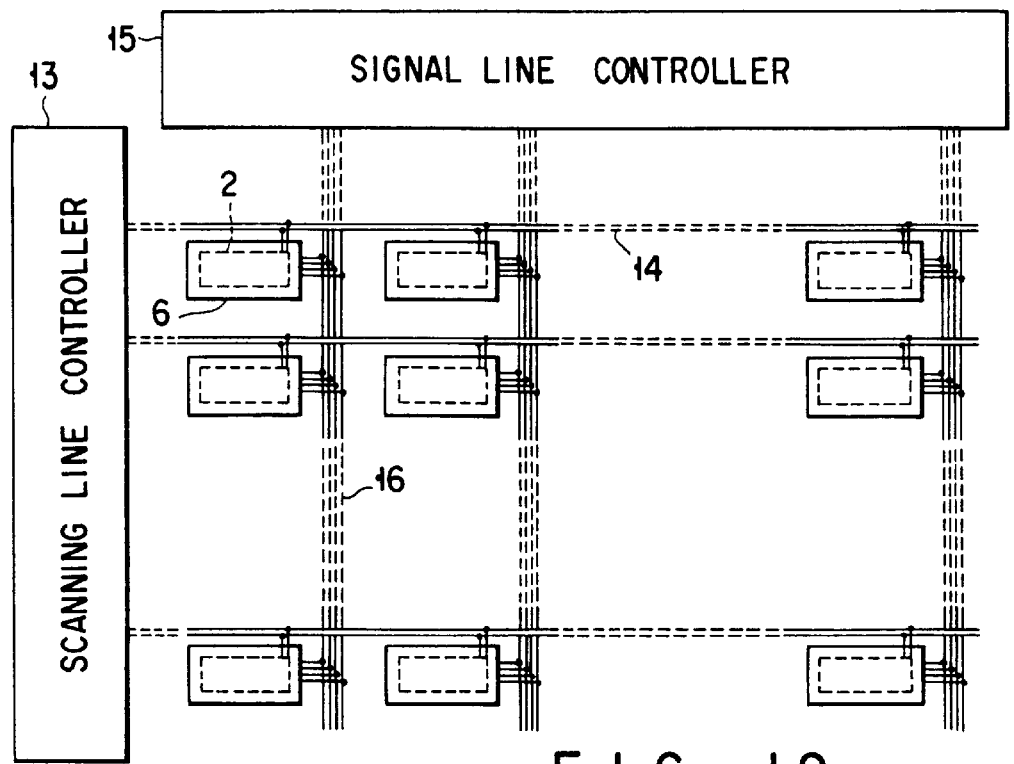
FIG. 19 is a circuit diagram of the driving circuit of the first embodiment.
Figure 20:
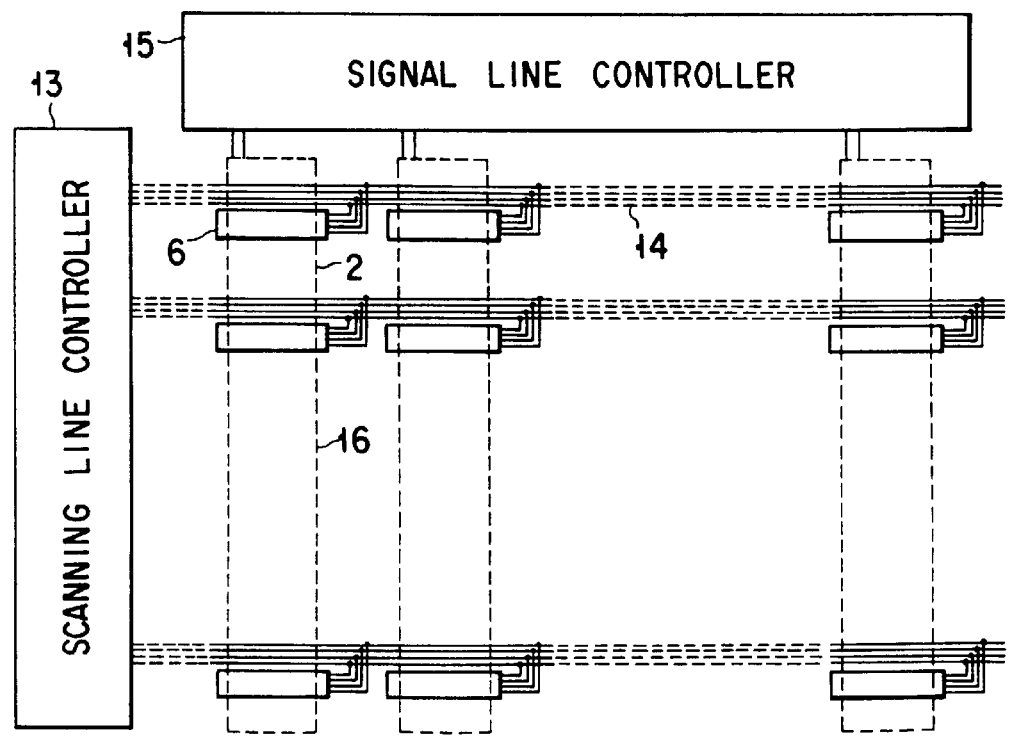
FIG. 20 is a circuit diagram of a modification of the driving circuit of the first embodiment.

In FIG. 20, a voltage is supplied to the actuatable film 6 via the scanning lines 14, whereas a voltage is supplied to the fixed film 2 via the signal lines 16, which is the reverse of FIG. 19. The rest is the same as in FIG. 19.

As explained above, since the actuatable film-type display device of the present embodiment is of the reflection type, a back light is not required. Furthermore, since the display device is mechanical, it remains stopped after once actuated and therefore has a memory function, with the result that it consumes no electric power in displaying a still picture. In addition, even at the time of driving, it does not draw much current, it consumes less electric power.

Furthermore, the actuatable film for each pixel is housed under the adjacent pixel, so that the aperture rate can be made almost 100%. If the reflection plate is a complete diffusion plate with a reflectivity of 100%, a very bright reflection-type display device with a light use efficiency of almost 100% will be achieved.

Furthermore, when color display is effected, there is practically no problem from the viewpoint of human sensitivity, because the moving of a cyan, magenta, yellow (additionally, black) films produces a color reproduction range equivalent to printed matter. Theoretically, this level cannot be achieved in the ECB mode or GH mode of a liquid-crystal display. It is necessary to provide a polarization plate in the ECB mode of a liquid-crystal display. Since the polarization plate transmits light only 50% of the incident light, a bright color cannot be displayed in the ECB mode. If a white light is incident on the reflection type LCD of ECB mode, light is reduced and gray image is displayed. It is not necessary to provide a polarization plate in the GH mode of a liquid-crystal display. However, it is necessary to overlap cyan, magenta, yellow cells in order to color-display. Therefore, the incident light must pass through twelve ITO of which transmittance is 95% at most. The resultant transmittance is $0.95^{12}=0.54$ so that a bright color cannot be displayed and a gray image is displayed even if a white light is incident on the LCD. When the limitations of the aperture rate and reflection rate of the fixed plate are considered, the display becomes more dark. As a result, the reflection type LCD cannot display an image like a printed material.

In addition, because a film is used in the display section, particularly when a plastic film is used, the display section is not limited in size and very light, contrary to the glass plate or Si wafer.

Hereinafter, another embodiment of the present invention will be explained.

Second Embodiment

Figure 21:
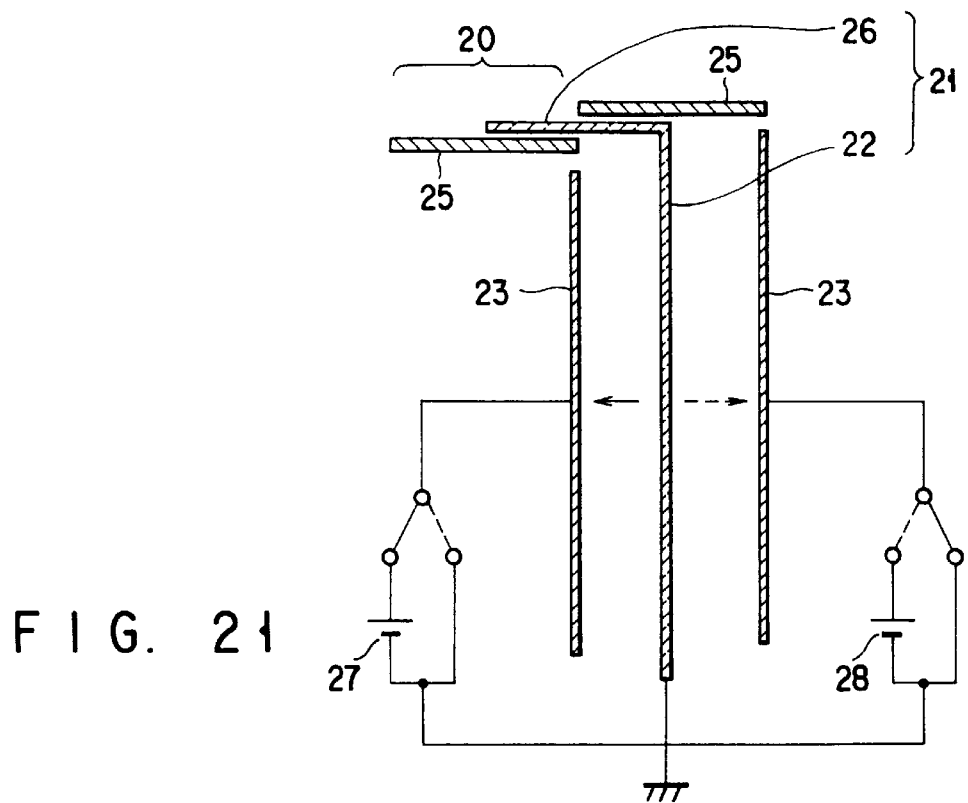
FIG. 21 is a sectional view of a main portion of an actuatable-film display device according to a second embodiment of the present invention.

FIG. 21 is an enlarged sectional view of one pixel in an actuatable film-type display device according to a second embodiment of the present invention. In FIG. 21, an actuatable film 21 is composed of an actuatable driving electrode section 22 and a display section 26. On both sides of the actuatable driving electrode section 22, fixed driving electrodes 23 are provided. Above and below the display section 26, white plates 25 are provided so that they may not align with each other.

The actuatable film 21 is secured at the root to a substrate (not shown) as if it were a cantilever, and can be bent to both of the right and the left in the figure.

Furthermore, the bend portion separating the display section 26 from the actuatable driving electrode section 22 in the actuatable film 21 is allowed to bend freely.

The display principle of the present embodiment is that monochromatic or color display is effected by inserting and taking out a display section 26 colored black or another color into and from the gap between two white plates 25. A method of moving an actuatable film 21 makes use of electrostatic force exerted on the actuatable film 21 by causing power supplies 27, 28 to applying to either a right or a left fixed driving electrode 23 the potential difference to an actuatable driving electrode section 22.

Figure 22:
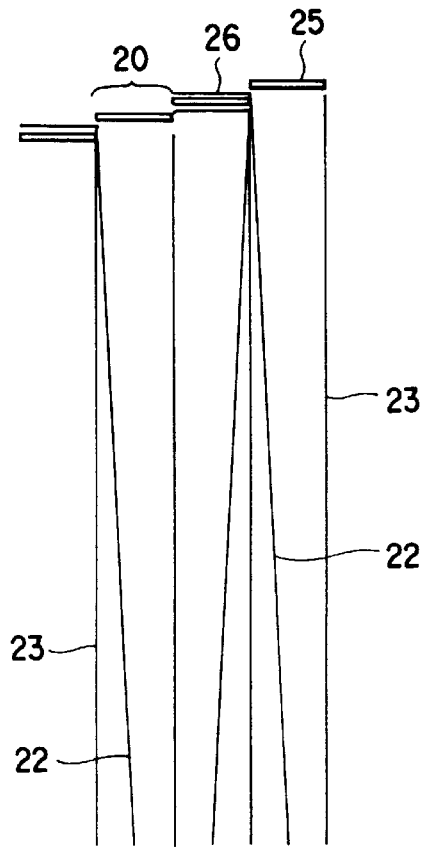
FIG. 22 is a sectional view of an example of driving the actuatable films in the second embodiment.
Figure 23:
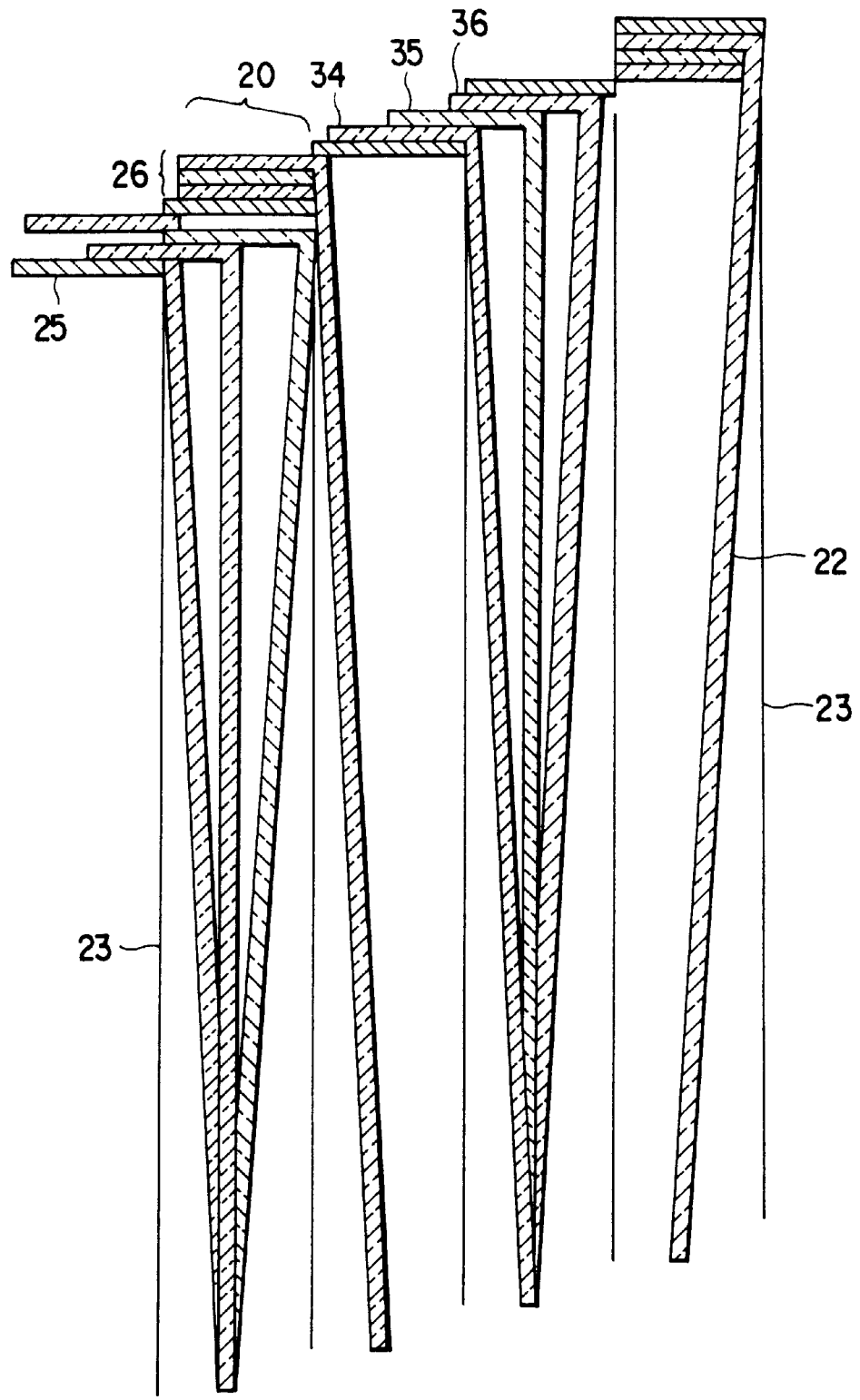
FIG. 23 is a sectional view of another example of driving the actuatable films in the second embodiment.

In an actuatable-film-type display device explained in this embodiment, the above-mentioned one pixel is formed two-dimensionally into a matrix, forming a display device. FIGS. 22 and 23 are schematic sectional views of the display device.

It is desirable that the ratio of the length of the display section 26 to that of the actuatable driving electrode section 22 should be as large as possible as shown in FIGS. 22 and 23. Taking into account easy movement of the display section 26, it is particularly desirable that (the length of the display section 26)/(the length of the actuatable driving electrode 22) should be in the range of 0.01 to 0.1.

FIG. 22 is a sectional view of the display device in the monochromatic display mode, where a black display electrode 26 is inserted into and taken out from the gap between two white plates 25.

FIG. 23 is a sectional view of the display device in the color display mode, where a cyan, magenta, and yellow transparent films 34, 35, 36 are inserted into and taken out from the gap between two white plates 25 to effect color display equivalent to printed matter. When colors other than cyan, magenta, and yellow are displayed, for example, the yellow and magenta films are stacked together to produce red, the cyan and magenta films are stacked together to produce blue, and the cyan and yellow films are stacked together to produce green.

To effect gradation display, the area gradation scheme is used and the way the colored films overlap with the pixel area is adjusted. For example, to display pink, an intermediate color between red and white, the yellow and magenta films are stacked together and extended to a half of the pixel area 20. By doing this, the area ratio of white to red in the pixel becomes 1:1, producing an intermediate color, or pink. This is the same as the gradation display scheme for printed matter.

FIG. 24 is a perspective view of one pixel capable of binary display such as monochromatic display in the actuatable-film-type display device. In the explanation given below, the above-described parts are indicated by the same reference numerals and they will not be described in detail.

Figure 25:
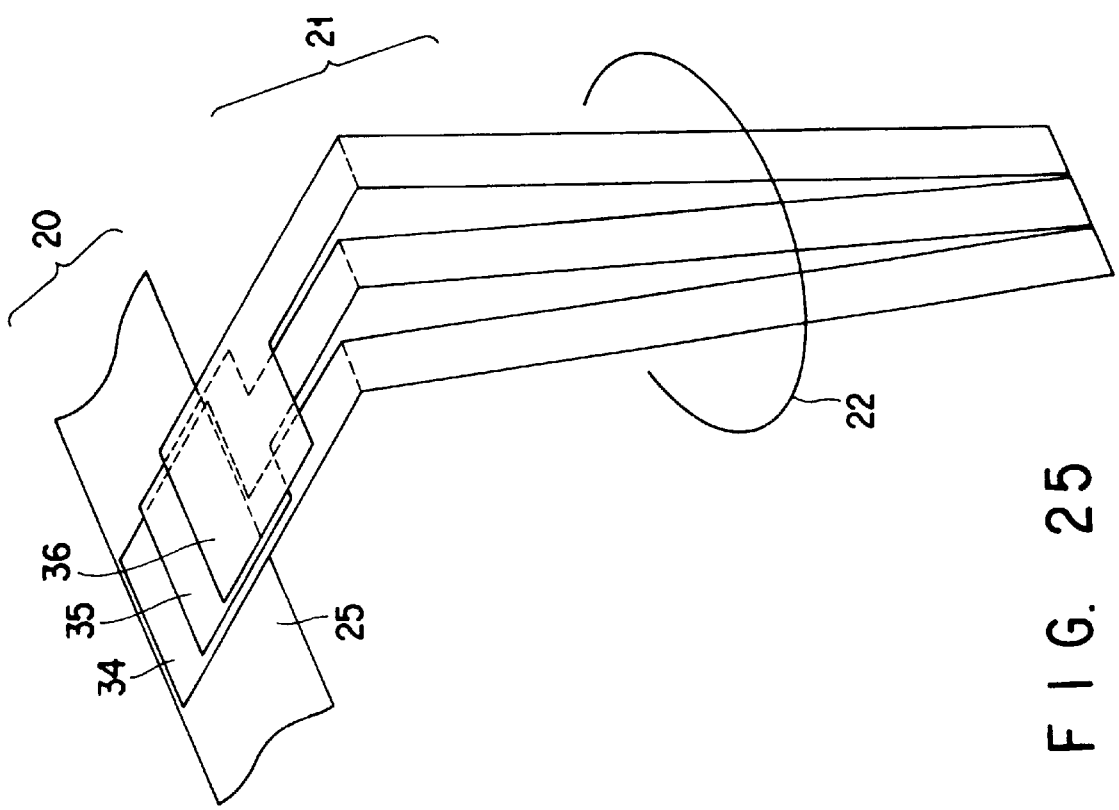
FIG. 25 is a perspective view of another actuatable film structure in the second embodiment.

FIG. 25 shows the arrangement of the actuatable films for color display in a modification of the structure of one pixel associated with the present invention. The cyan, magenta, and yellow transparent display sections of the actuatable films 34, 35, 36 are stacked together and the actuatable driving electrode sections 22 are attached to the left end of the display section of actuatable film 34, the center of the display section of actuatable film 35, and the right end of the display section of actuatable film 36, respectively, so that they may not overlap with each other. By adjusting the movement of each actuatable film, any combination of the above three colors can be taken out from the two white plates 25.

Figure 26:
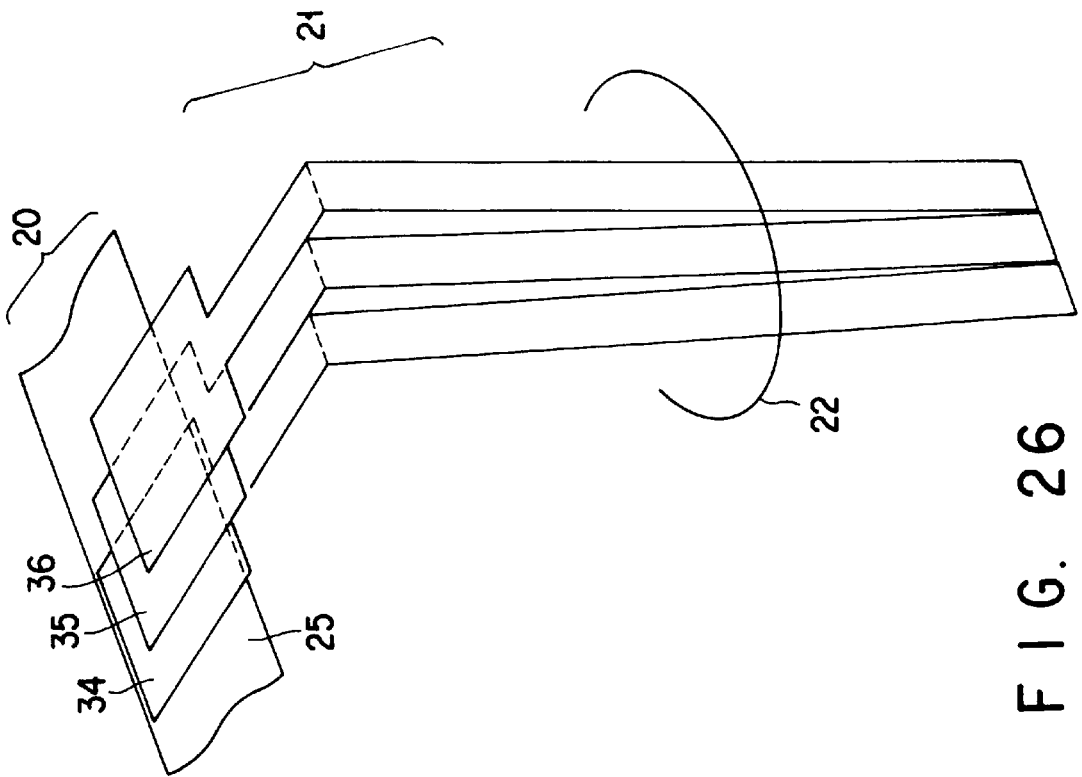
FIG. 26 is a perspective view of still another actuatable film structure in the second embodiment.

FIG. 26 shows an embodiment of the structure of one pixel for color display. In this embodiment, the actuatable films for individual colors have the same structure, that is, the actuatable electrode section is attached to the center of the display section. Therefore, the display sections of the actuatable films 34, 35, 36 do not align with each other. The example in FIG. 26 is balanced better in structure than the example in FIG. 25. Since there is color shift, the present modification will give the desired effect on an ultrahigh definition display device where each pixel is invisible. Generally, colored dots of a printed material such as gravure photograph are not aligned. This is because that a moire pattern is generated if the dots are aligned when an intermediate color is displayed by the area of the dots. Therefore, it is possible to smoothly display an intermediate color by using nonaligned cyan, magenta, yellow dots in the actuatable-film-type display device in which dots are very minute and cannot be visible. However, it is preferable to align the colored dots if the dot is large enough to be visible.

The sectional structure of the actuatable film 21 will be explained. If the actuatable film 21 is made of a conductive material, such as a metal foil, it can also serve as an actuatable electrode section 22. If the actuatable film 21 is made of an insulating material, such as a polymer film or a glass film, a conductive material for an actuatable electrode must be bonded to the actuatable film 21.

Figure 27:
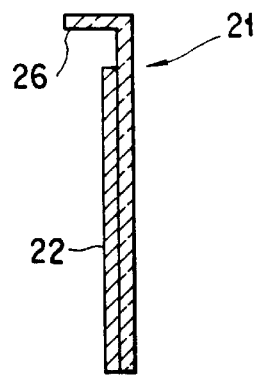
FIG. 27 is a sectional view of a further example of an actuatable film in the second embodiment.

FIG. 27 shows the position of the actuatable electrode section 22 made of a conductive material with respect to the actuatable film 21 in the present embodiment. A manufacturing method will be explained later. In FIG. 27, the actuatable electrode section 22 made of a conductive material is located on the display section 26 side of the actuatable film 21.

Figure 28:
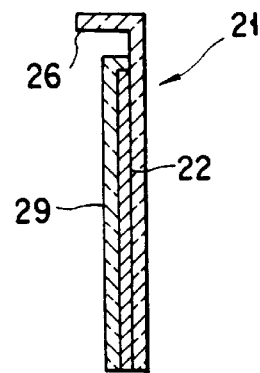
FIG. 28 is a sectional view of still further example of an actuatable film in the second embodiment.

FIG. 28 shows a modification of the structure of FIG. 27. As shown in the figure, an insulating film 29 may be further coated on the conductive material of the actuatable electrode section 22.

Figure 29:
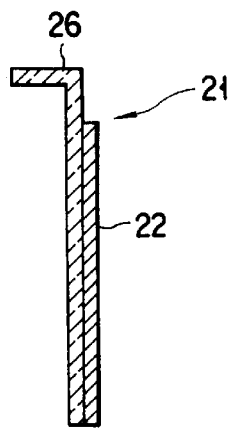
FIG. 29 is a sectional view of still another example of an actuatable film in the second embodiment.

FIG. 29 shows another modification of the structure of FIG. 27. As shown in the figure, the actuatable electrode section 22 may be located on the opposite side to the display section 26. Though not shown, an insulating film may be further coated on the conductive material of the actuatable electrode section 22.

To hold the state of the actuatable film 21, the display section 26 must also be made conductive. Hereinafter, a modification where the display section 26 is made conductive will be explained.

Figure 30:
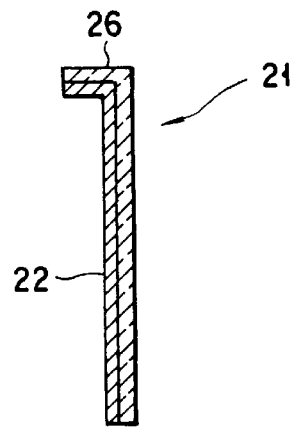
FIG. 30 is a sectional view of still further example of an actuatable film in the second embodiment.

In FIG. 30, a conductive portion (electrode) for the holding operation is made of the common conductive material to the above-described actuatable electrode section 22. To effect color display, the conductive material must be transparent or have the same color as the display section 26.

Figure 31:
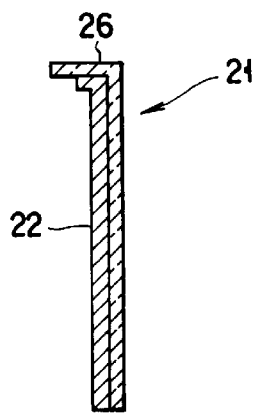
FIG. 31 is a sectional view of still another example of an actuatable film in the second embodiment.

As shown in FIG. 31, the conductive section 22 for a holding operation may be provided so as to keep away from the actually used display area.

Figure 32:
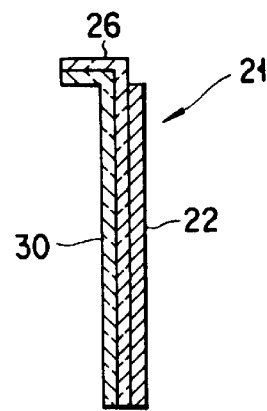
FIG. 32 is a sectional view of still further example of an actuatable film in the second embodiment.

FIG. 32 shows a modification where the actuatable electrode section 22 and the conductive section 30 for a holding operation are allocated to separate electrodes. It is desirable that the conductive section 30 should be a transparent electrode.

In FIG. 33, the actuatable film 21 itself is an electret 31 and is not conductive. The charges in the electret are attracted by the electrostatic field, thereby moving the actuatable film.

FIG. 34 shows a modification where the display section 26 and the actuatable electrode section 22 are made of a different polymer material. Although the display section 26 must be made transparent when color display is effected, the actuatable electrode section 22 need not be transparent. Because of metal coating or insulating-film coating, it is desirable that the actuatable electrode section 22 should be heat-resistant. Therefore, the display section 26 is made of a transparent film, such as polyester, and the film 33 near the actuatable electrode section 22 is made of heat-resistant polyimide. The films may be bonded with an adhesive. If the films are thermoplastic, they may be melted thermally and bonded together.

FIG. 35 shows a further modification. As shown in the figure, bending force of a bimorph piezoelectric film 37 may be used in a method of driving the actuatable film 21. Numeral 40 indicates a power supply that applies a voltage to the bimorph piezoelectric film 37.

Hereinafter, the operation principle of the second embodiment will be explained in detail.

First, as shown in FIG. 36, a potential difference is applied between two fixed driving electrodes 23 sandwiching the driving electrode 22 of the actuatable film 21, thereby generating an electric field. At this time, the actuatable electrode section 22 of the actuatable film 21 is applied with the same potential as either of the two fixed electrode sections 23. Then, the actuatable electrode section 22 of the actuatable film 21 is attracted toward either of the two fixed driving electrodes 23, comes into contact with it, and stops. Here, the capacitor formed between the actuatable electrode section 22 of the actuatable film 21 and the fixed driving electrode 23 is called a driving capacitor (Cd).

If the potential relationship between the two fixed driving electrodes 23 is reversed, then the actuatable film 21 will be attracted in the opposite direction. At this time, force F exerted on the actuatable film 21 will be expressed by the following equation:

$$F=\epsilon SV^2/(2d^2) \qquad (3)$$

where $\epsilon$ is the permittivity, S is the smaller of the area of the actuatable electrode section 22 and the area of the fixed driving electrode 23, and d is the gap between the actuatable electrode section and the fixed driving electrode. For example, the pixel pitch is determined to be 300 $\mu$m, d is determined to be d=300 $\mu$m, and S is determined to be 0.9 mm$^2$. If air is filled between the actuatable electrode section 22 and the fixed driving electrode 23, $\epsilon$ will be:

$$\epsilon=8.85\times10^{12}$$

If the potential difference V is 200 V, the generated force F will be:

$$F=3.54\times10^{-6}[N]=3.6[mgf] \qquad (4)$$

At this time, the actuatable film weighs about 1 $\mu$g, which causes no problem in driving. It is assumed that the film is made of polymer, glass, carbon fiber, and metal foil and has an elastic modulus of 100 to 10,000 kg/mm$^2$. The experiment results have shown that the aforementioned force provides sufficient driving.

Although two fixed driving electrodes 23 are used in the embodiment, use of only one fixed driving electrode 23 also enables the actuatable film to be attracted likewise. In this case, to restore the actuatable film to the original state, bending elastic force of the film itself is used.

The function of the holding electrode 24 shown in FIG. 36 will be explained. The display section 26 is black or colored transparent as described above. The electrode, which is called a display electrode 38. As shown in FIG. 36, the holding electrode 24 and the display electrode 36 forms a capacitor via the insulating film and the gap. Here, the capacitor is called a holding capacitor (Ch). By applying the potential difference between the holding electrode 24 and the display electrode 38, electrostatic force expressed by equation (3) is exerted, thereby securing the actuatable film 21. When dot matrix display is effected, the fixed driving electrode 23 may be at the signal line potential or the scanning line potential, so that it cannot be fixed at a constant potential. Then, by keeping the holding electrode 24 at a constant potential, the actuatable film can be fixed, regardless of the signal line potential or the scanning line potential. At this time, a direct-current voltage is applied to the capacitor Ch composed of the holding electrode 24 and the display electrode 38 and no power is consumed in a steady state. This means that the display device has a memory function and consumes no power in displaying a still picture.

Furthermore, the holding electrode 24 has a gradation control function. Specifically, as described earlier, since the display device produces gradation by the area gradation scheme, the actuatable film that moves the display section must be stopped at a specific position corresponding to gradation. Use of only the fixed driving electrode 23 and the actuatable electrode section 22 of the actuatable film, or only Cd cannot stop the display section at a specific position. By controlling the timing of voltage pulses applied to the driving capacitor Cd and the holding capacitor Ch, the display section can be moved by a specific gradation and then stopped. The gradation display function can control the display section in an analog manner and therefore provide full-color display.

When white plates 25 are stacked as shown in FIGS. 21 and 36, the stacked white plates 25 become higher as they come closer to the right of figure, with the result that the display surface is inclined on the whole. To overcome this drawback, as shown in FIG. 37, by stacking the white plates 25 somewhat obliquely as in the first embodiment, the display screen of the same height as a whole can be obtained. As shown in FIG. 37, a transparent electrode 39 may be provided on a cover glass and a holding capacitor Ch may be formed between the transparent electrode 39 and the electrode on the white plate 25. In this case, electrodes may not be formed on the display section 26.

Hereinafter, materials for the display device and a method of manufacturing the display device will be explained.

As for the materials for the actuatable film 21, fixed driving electrode 22, white plate 25, and display section 26, it is desirable that the insulating sections should be made of a film of an organic polymer or copolymer, such as polyester such as polyethylene terephthalate (PET), polyimide, nylon, polystyrene, polycarbonate, polymethyl methacrylate, polyethylene, polypropylene, polyether sulfonate, polytetrafluoroethylene, polyphenyl sulfite, or an inorganic material, such as glass, carbon fiber, mica, silicon oxide, silicon nitride, aluminum nitride, from the points of view of workability, heat-resistance, and transparency. It is desirable that the conductive sections should be made of metal, such as aluminum, copper, gold, silver, nickel, chromium, iron, molybdenum, titanium, tungsten, or tantalum, or an alloy of these metals, from the points of view of conductivity and workability. The body of the actuatable film 21 may be made of the insulating material, on which the conductive material is coated, on which the insulating material is further coated. Furthermore, the body of the actuatable film 21 may be made of a foil of the above metal, on which the insulating material is coated.

For example, copper is deposited on a 12-$\mu$m-thick PET film to a thickness of 10 nm to 1 $\mu$m by evaporation or sputtering. The metal in the portion corresponding to the display portion is etched away. Then, the display section 26 is coated with black opaque ink or cyan, magenta, or yellow transparent ink to a thickness of 100 nm to 10 $\mu$m. The film thus formed is an actuatable film 21.

Furthermore, the opposite side to the metal-coated side may be coated with the ink in advance and the ink may be patterned before the metal is etched.

For example, with a pixel pitch of 300 $\mu$m, the film is cut into strips whose width is about 290 $\mu$m and whose length is about 6 mm. The strips are placed side by side with a pitch of 300 $\mu$m and fixed with adhesive tape. To electrically connect the adjacent electrodes on the actuatable film 21, they are fixed with conductive tape.

Then, the film 21 near the display area is bent about 90 degrees. To bend the film, the film is placed in a mold and heated to a temperature higher than the softening point of the film.

A method of manufacturing the above-described fixed driving electrode 23 will be explained. Copper is deposited on a 2-$\mu$m-thick PET film to a thickness of 10 nm to 1 $\mu$m by evaporation or sputtering. The resulting film may be further coated with an insulating film. The film thus formed is cut into strips whose width is 3 mm. The strips are placed side by side with a pitch of 300 $\mu$m.

FIG. 38 shows an assembly diagram of the display device. An actuatable film composite member 48 on which the above-described rectangular fixed driving electrodes are formed is inserted in a fixed portion composite member 50 where a plurality of fixed sections are placed side by side. The actuatable film 21 is electrically connected in the direction going far back in the figure. The end of the film is connected to TAB-IC 54 via anisotropic conductive rubber 52. The actuatable film may be connected to the scanning line. The fixed driving electrode 23 is connected to a signal line 60 on a base substrate 58 via an anisotropic conductive film 56. Numeral 50 indicate a scanning line, which is connected to TAB-IC 54 via anisotropic conductive rubber 52.

Adhesive may be applied to the roots of the actuatable film 21 and fixed driving electrode 23 serving as the scanning line 50 and signal line 60 and they may be bonded together to prevent misalignment. Furthermore, a firm frame may be prepared and the ends of the film may be secured to the frame to prevent the misalignment of the film.

Furthermore, the display section 26 of the actuatable film 21 is able to come out of the slits provided at regular intervals on the white plate 25. An electrode may be formed on the white plate 25 to provide a holding electrode 24. In this case, as shown in FIG. 38, the holding electrode itself may be a scanning line, which is connected to TAB-IC 62. It is desirable depending on the situation that a cover glass 64, a protective substrate, which is not necessarily needed, should be provided and the actuatable film and fixed driving electrode be sealed in an atmosphere of an inert gas such as nitrogen, because this prevents charged dust from adhering to the surface of the electrode.

Figure 39:
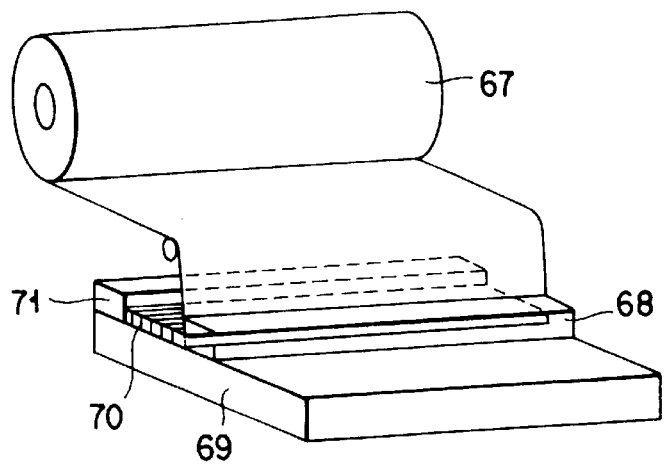
FIG. 39 shows a method of manufacturing actuatable films and fixed films in the second embodiment.

One method of arranging films such as the above-described actuatable film and fixed driving electrode film is shown in FIG. 39. A rolled film 67 has been coated with conductive material, patterned, and colored. A film cutter and film laminating machine 68 formed on a table 69 pulls in a film, cuts it, bends it suitably, and sticks it. Then, as shown by numeral 70, the assembly of the actuatable film and fixed film in the display device is produced. This method is excellent in mass production and contributes to automatic assembly of the display device.

Hereinafter, a matrix display driving method will be explained.

Figure 40A:
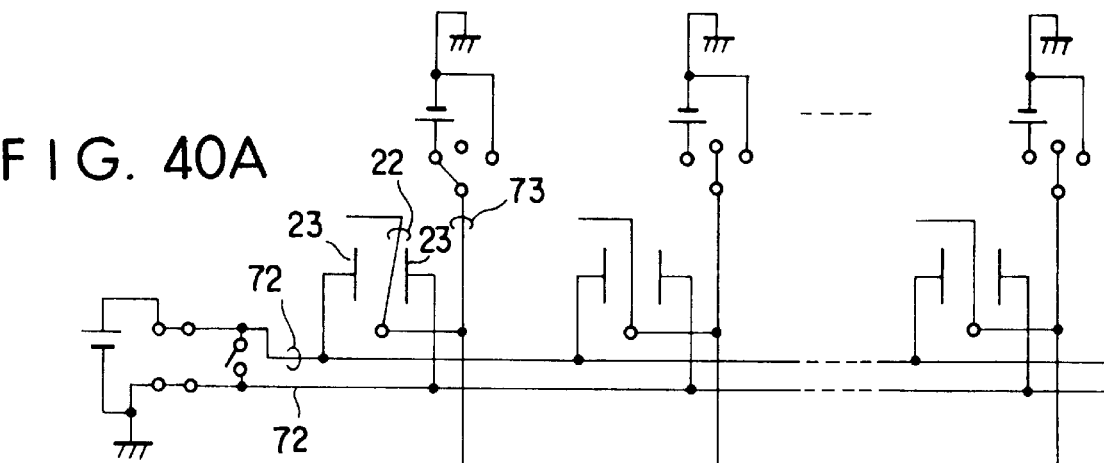
FIG. 40 is a circuit diagram of an example of the driving circuit for matrix display in the second embodiment.
Figure 40B:
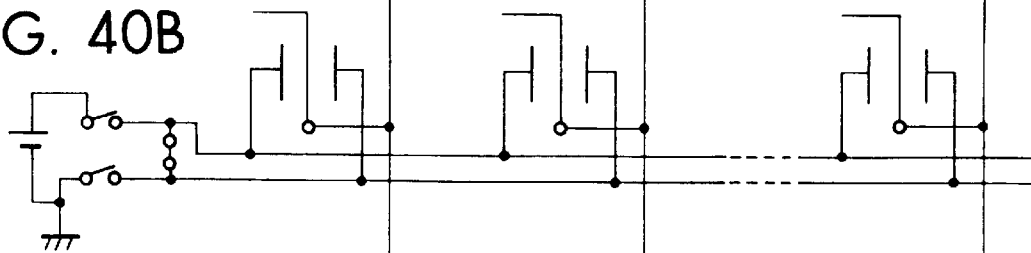
Figure 40C:
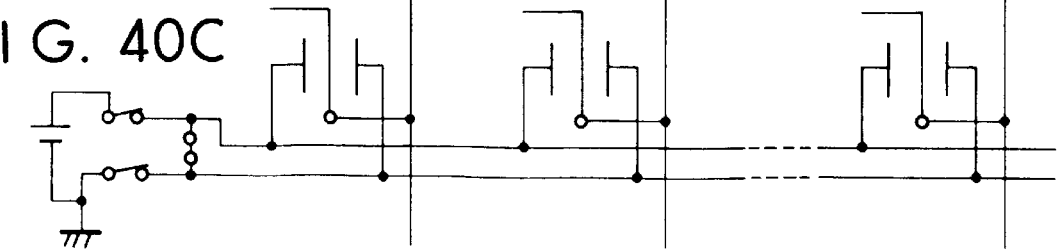

In FIG. 40, the actuatable electrode section 22 of the actuatable film 21 with the display section 26 is connected to a signal line 73, and the two fixed driving electrodes 23 are connected to a scanning line 72. The signal line 73 can be set to one of a power supply voltage, a floating potential, and a ground potential and be controlled by an externally inputted synchronizing signal and video signal. Like the fixed driving electrodes, two scanning lines 72 are provided for a single pixel. Their potential can be set to one of a power supply voltage, a floating potential, and the ground potential and be controlled by an externally inputted synchronizing signal and video signal.

A time chart for the matrix driving scheme will be explained. For the sake of simplification, explanation will be given using a display example of a 3×3 matrix shown in FIG. 41. Symbols S1 to S3 indicate signal lines, A1 to A3 indicate address lines (scanning lines), VS1 to VS3 represent the potential of the address lines, AL1 to AL3, AR1 to AR3 denote scanning lines because each pixel has two scanning lines, and VAL1 to VAL3, VAR1 to VAR3 indicate the potential of the scanning lines. These are shown in an equivalent circuit of one pixel in FIG. 42.

To provide a display of FIG. 41, voltages are applied sequentially to the scanning lines and signal lines according to a time chart as shown in FIG. 43. Because this structure has no holding capacitor Ch, it is necessary to continue applying the driving voltage signal even when a still picture is displayed. When the elastic modulus of the actuatable film 21 is sufficiently small, however, the position of the actuatable film can be retained by friction even in the state where no voltage is applied. The broken lines in FIG. 43 indicate the floating potential.

Figure 44:
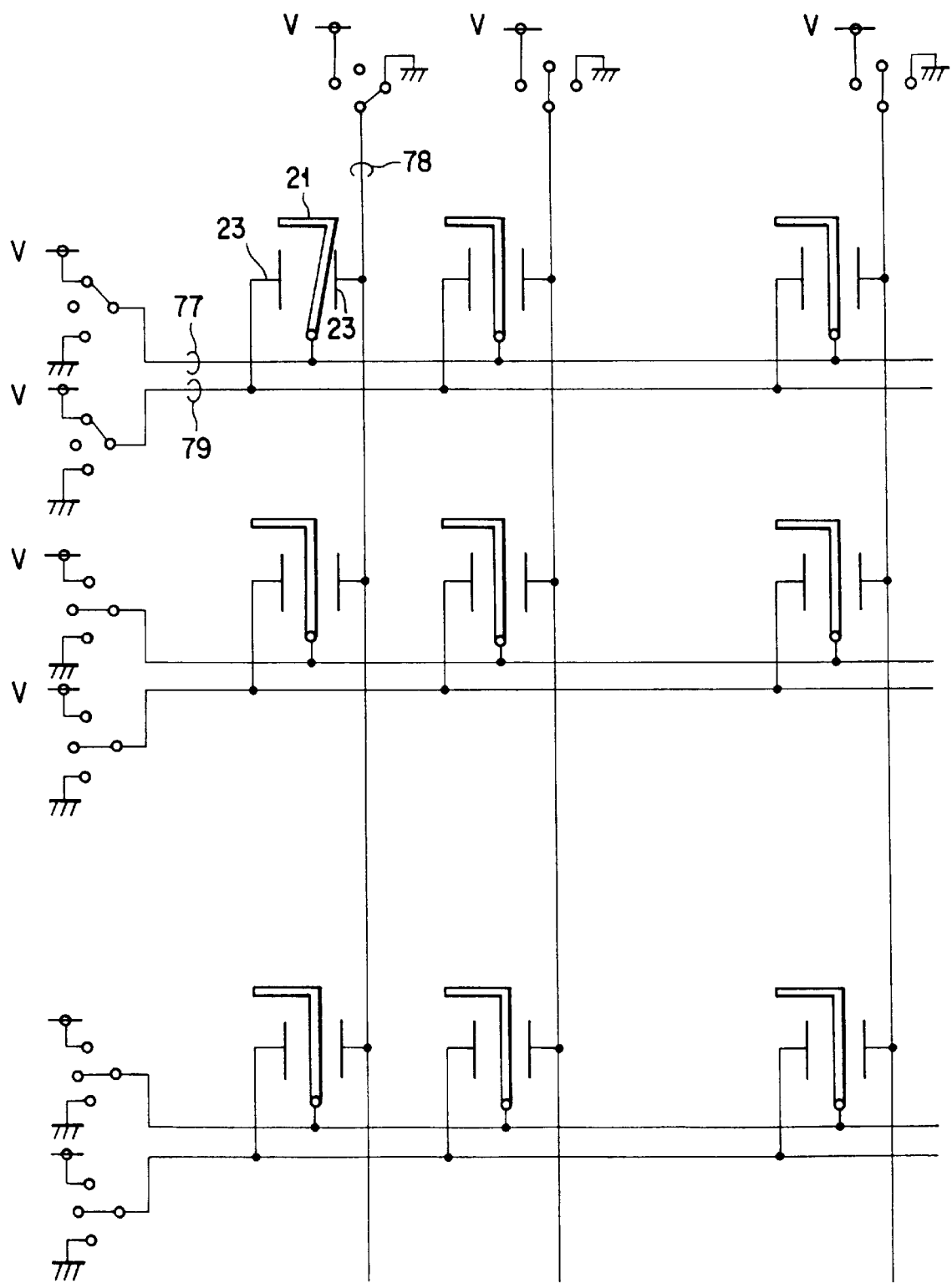
FIG. 44 is a circuit diagram of another example of the driving circuit for matrix display in the second embodiment.

In FIG. 44, the actuatable electrode section 22 of the actuatable film 21 with the display section 26 is connected to a first scanning line 77 and one of the two fixed driving electrodes 23 is connected to a signal line 78 and the other is connected to a second scanning line 79. Any of the first scanning lines 77, 79 and signal line 78 can be set to one of a power supply voltage, a floating potential, and a ground potential and be controlled by an externally inputted synchronizing signal and video signal.

Figures 46A, 46B, 46C, 46D, 46E, 46F, 46G, 46H, 46I:
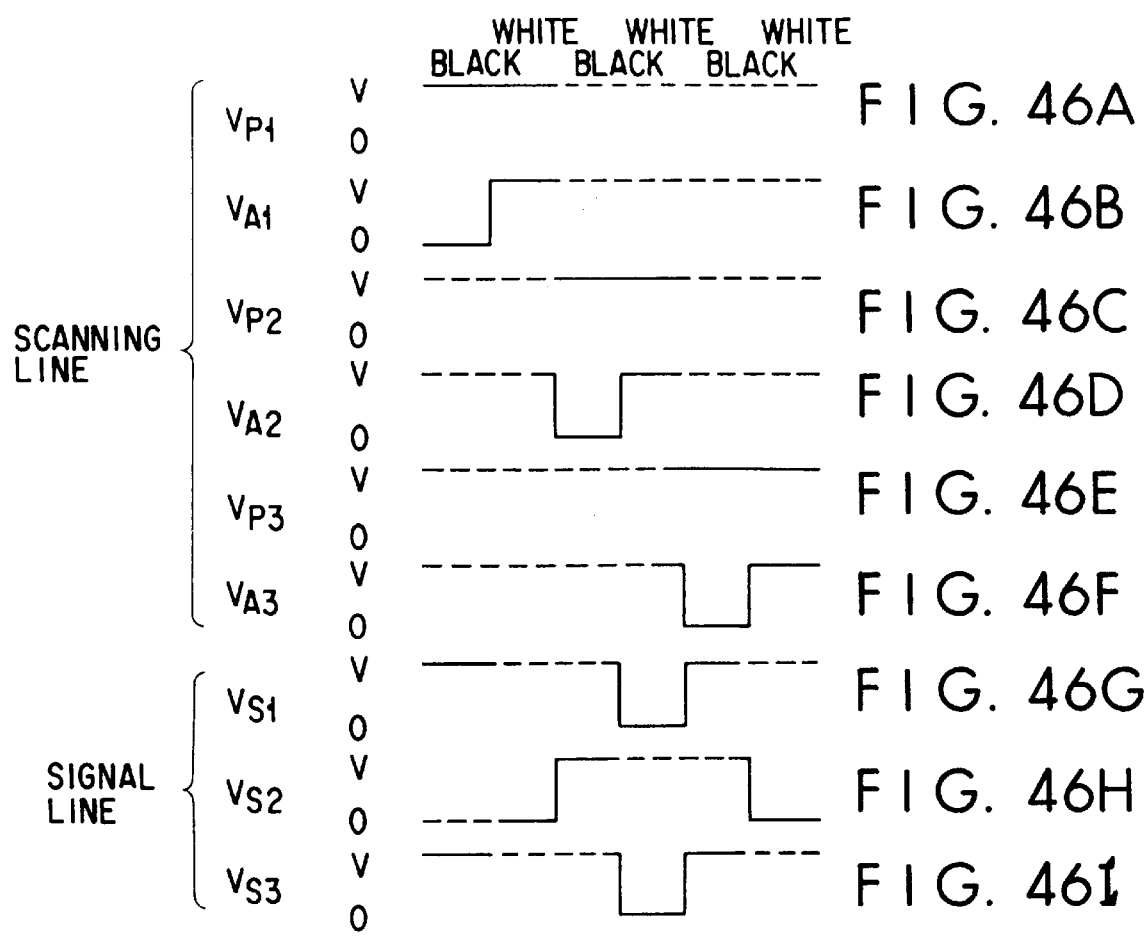
FIG. 46 is a waveform diagram of the driving signal in the driving circuit of FIG. 44.

A time chart for the matrix driving scheme will be described. For simplicity's sake, explanation will be given using a display example of a 3×3 matrix shown in FIG. 41. Symbols S1 to S3 indicate signal lines and VS1 to VS3 denote the potential of the signal lines. Since each pixel has two scanning lines, P1 to P3 indicate those connected to the display section and A1 to A3 represent those connected to the fixed electrodes, for convenience's sake, and VP1 to VP3, VA1 to VA3 indicate the potential of the scanning lines. These are shown in an equivalent circuit of one pixel in FIG. 45. To provide a display of FIG. 41, voltages are applied sequentially to the scanning lines and signal lines according to a time chart as shown in FIG. 46.

Because this structure has no holding capacitor Ch, it is necessary to continue applying the driving voltage signal even when a still picture is displayed. When the elastic modulus of the actuatable film 21 is sufficiently small, however, the position of the actuatable film can be retained even in the state where no voltage is applied.

Figure 47:
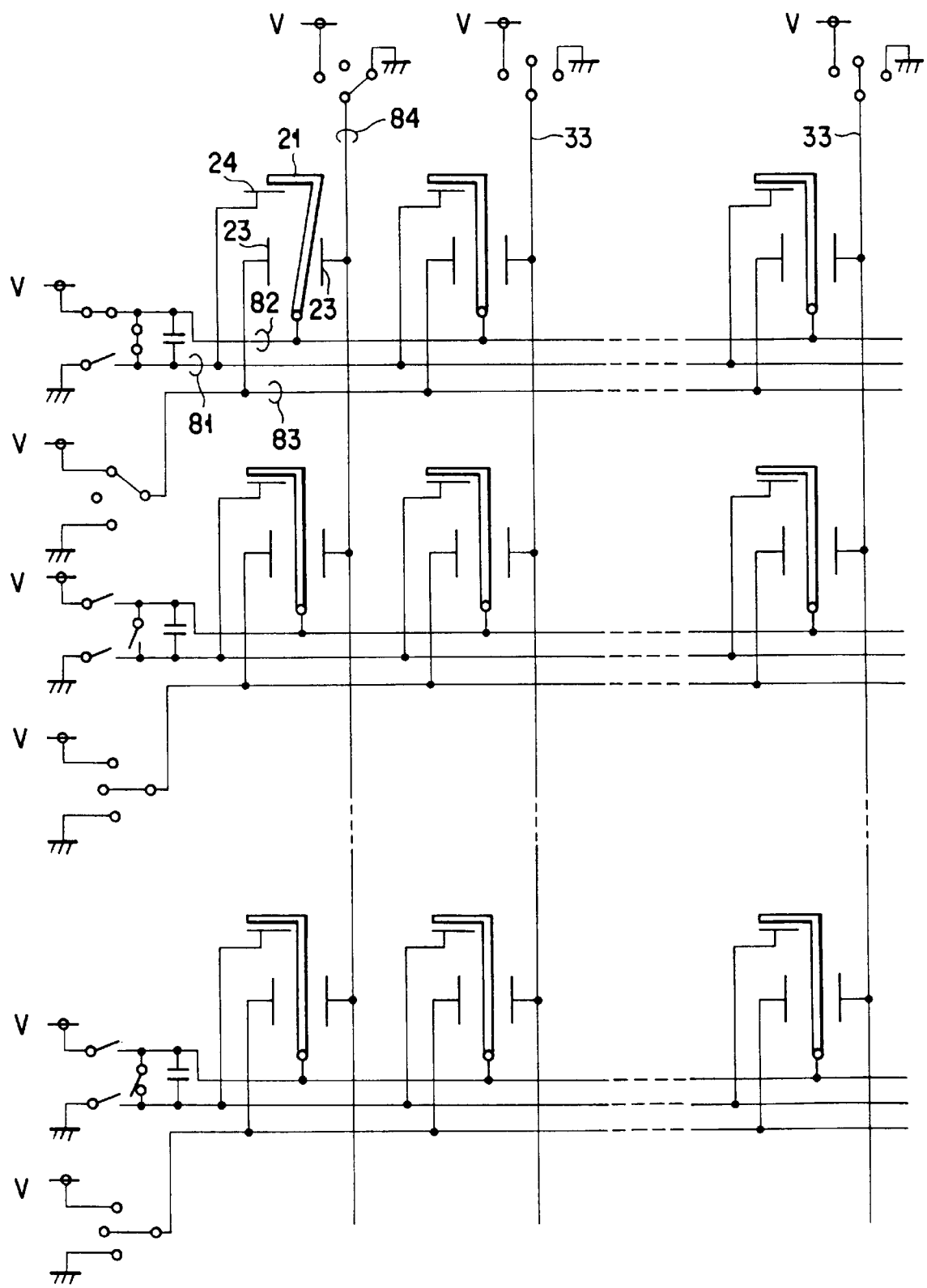
FIG. 47 is a circuit diagram of another example of the driving circuit for matrix display in the second embodiment.

In another example of the matrix driving scheme shown in FIG. 47, a holding capacitor Ch is provided between the holding electrode 24 and the display electrode. The holding capacitor Ch is connected to a first scanning line 81. The actuatable electrode section of the actuatable film 21 is connected to a second scanning line 82 for the electrode section only, and one of the two fixed driving electrodes 23 is connected to a third scanning line 83 for the driving electrode only. The other fixed driving electrode is connected to a signal line 84. All of these signal lines and scanning lines can be set to one of a power supply voltage, a floating potential, and a ground potential. The scanning line 81 of the holding capacitor Ch and the scanning line 82 of the actuatable electrode section can be set at the floating potential in a short-circuited state.

Figure 48:
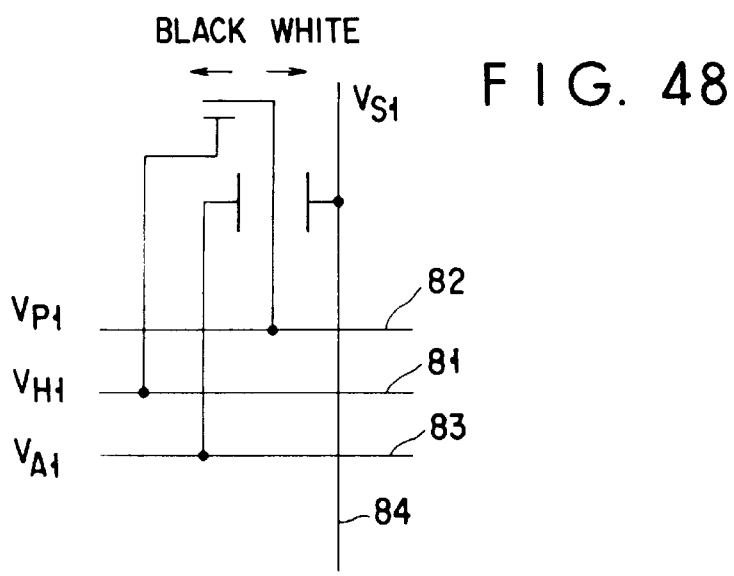
FIG. 48 shows an equivalent circuit of an pixel in the driving circuit of FIG. 47.

FIG. 48 shows an equivalent circuit of one pixel. Symbols VP1 to VP3 indicate the potential of scanning line 82 connected to the actuatable film, VH1 to VH3 indicate the potential of scanning line 81 connected to the holding electrode Ch, VA1 to VA3 denote the potential of scanning line 83 connected to the fixed driving electrode, and VS1 to VS3 represent the potential of signal line 84.

FIG. 49 is a time chart for the matrix driving scheme in the case of the 3×3 matrix display of FIG. 41.

In this driving scheme, by preventing a black write operation from being carried out simultaneously with a white write operation, unnecessary charging is eliminated, thereby reducing the power consumption.

The display device consumes no power in displaying a still picture. Even when a moving picture is displayed, a VGA-size display device with 640×480 pixels consumes 0.5 [W] or less.

As explained above, since the display device of the second embodiment is of the reflection type and has a high reflectivity, it enables paper white display, has a wide color reproduction range, and is low in cost and lightweight. Because a film substrate is used, any large display device can be made. The display device basically has a memory function, so that it has the ability to retain the image even when the power supply is off. Because it does not permit much current to flow, it consume very low power. The display device can be applied to portable information apparatuses required to consume less power, personal computers, electronic books, electronic newspaper, electronic notebooks, electronic posters, billboards, and console panels for control equipment. Because the display device provides bright color display equivalent to photogravure printing, it has new applications other than what is explained above.

Third Embodiment

A third embodiment of the present invention related to an improvement in a driving circuit capable of low power consumption even in displaying a moving picture will be described. The third embodiment can be applied to the display devices of the first and second embodiments. Here, a case where the device is applied to the device of the first embodiment will be explained. As shown in FIG. 50, pixels made of actuatable films 6 and fixed films 2 are arranged in a matrix, with signal lines laid vertically in the figure and scanning lines 92 laid horizontally in the figure. The signal lines 91 are connected to a signal line circuit 93, which distributes the video information (signal) sent to the display device to the individual signal lines 91. The scanning lines 92 select a pixel to which the signal is to be sent and are connected to a scanning line circuit 94.

The scanning line circuit 94 includes a shift register synchronized with the signal line circuit 93 and brings the scanning lines 92 sequentially into a selected state, starting at the top or the bottom. To the selected scanning line, a suitable potential, signal information, a pulse or pulses timed to each other are sent.

In the first embodiment, the electrode pattern of the fixed film 2 is of a two-phase structure that has an area where one electrode pitch slips relative to the other. The pattern has four wiring terminals 11. The electrode pattern of the actuatable film 6 is of a structure without an electrode pitch slip as shown in FIG. 18B and has two wiring terminals 11. In FIG. 50, a row contains five scanning lines, which are connected to the four wiring terminals 11 of the fixed film 2 and one wiring terminal of the actuatable film 6. A column contains one signal line, which is connected to one wiring terminal of the actuatable film 6.

The unselected scanning lines or the signal lines with the actuatable film remaining stopped are set at a floating potential. By doing this, charging and discharging relating to a capacitor between the signal lines and between the scanning lines and being irrelevant to display can be eliminated, resulting in a reduction in the power consumption.

A switch 95 in the signal line circuit 93 determines whether the signal line 92 is brought into the conducting state or the floating potential state, on the basis of the video information. A switch 96 in the scanning line circuit 94 determines whether the scanning line is brought into the conducting state or the floating potential state, on the basis of the shift register. Terminals 97 and 98 correspond to the first phase and the second phase of FIG. 8, respectively, and send pulses shifted a quarter of the period from each other.

As described above, with the display device of the present embodiment, since a floating potential is applied when the device is not in operation, a low-cost, less-power-consuming, thin, lightweight reflection-type multicolor display device can be achieved. Because of the reflection type, the device requires no back light and consumes less power. Therefore, the display device can be used as a small portable terminal such as PDA or the display for lap-top personal computers. Furthermore, because it has a high color reproduction and provides a beautiful multicolor display. Since it can be manufactured easily and be made larger, it may be used as a display device for color electronic books, color electronic encyclopedias, electronic posters, which are considered to be popularized in the future.

Since the display device of the present embodiment is of the reflection type and has a high reflectivity, it enables paper white display, has a wide color reproduction range, is low in cost and lightweight. Because a film substrate is used, any large display device can be made. The display device basically has a memory function, so that it has the ability to retain the image even when the power supply is off. Because it does not permit much current to flow even during driving, it consume much less power.

The display device can be applied to portable information apparatuses required to consume less power, personal computers, electronic books, electronic newspaper, electronic notebooks, electronic posters, billboards, and console panels for control equipment. Because the display device provides bright color display equivalent to photogravure printing, it has new applications other than what is explained above.

The present invention is not restricted to the above-described embodiments, but may be practiced or embodied in still other ways without departing from the spirit or essential character thereof. For instance, while in the embodiments, part of signal lines are also brought into a floating state, only the unselected scanning lines may be brought into a floating state. Though the detailed description is omitted, the third embodiment can be applied to the second embodiment.

Fourth Embodiment

FIG. 51 is a diagram to help explain a projection-type display device according to a fourth embodiment of the present invention. In the embodiment, the white light emitted from a white light source 103 composed of a metal halide lamp is once gathered by an elliptical reflector 106 and then reflected by a micromirror 108 and thereafter made parallel by a condenser lens 107. The light that has entered a display module 101 (a reflection-type display section that displays an image, corresponding to the display device in the first and second embodiments) undergoes mirror reflection and is gathered again on the condenser lens 107. Thereafter, a projection lens 104 enlarges and projects the displayed image on the display module 101 onto a screen 105. While in the embodiment, the image is enlarged and projected, use of a reduced projection lens enables the image to be reduced and projected. Although not shown, a light guide also serving as a shielding plate is provided between the reflector 106 and the micromirror 108 to remove the light components from the light source 103 directly entering the projection lens 104.

The display module 101 employs a structure as explained in the first embodiment. In the module, three actuatable films 203 to 205 and fixed films 206, 207, . . . are stacked alternately. FIG. 52 is a sectional view of these films. Each of the actuatable films 203 to 205 is made of a dielectric interference film laminated on a transparent substrate. They constitute a reflection-type color filter and reflect the wavelength regions of the additive primary colors, red, green, and blue, respectively, and allow the wavelength regions of the subtractive primary colors, cyan, magenta, and yellow (the complementary colors to red, green, and blue) to pass through.

In the pixel display section 201, all of the three actuatable films cover the display section 201. The red component of the incident white light is reflected by the first layer of actuatable film 203 and the cyan component, complementary color to red, passes through. The green component of the transmitted cyan light is reflected by the second layer of actuatable film 204 and the blue component passes through. The transmitted blue light is reflected by the third layer of actuatable film 205. Because the green light passes through the first layer of actuatable film, the blue light passes through the first and second layers of actuatable films, the light reflected by the pixel 201 becomes white light obtained as a result of the incident white light being reflected over the entire wavelength region. Although not shown, striped electrodes are formed between the hidden portion of the actuatable film and the fixed film. On the other hand, in the adjacent pixel display section 202, all of the three layers of actuatable films 203 to 205 are placed under the fixed film 206 of the adjacent pixel, so that light directly enters the fixed film 207. Since the light directly enters the fixed film 207. Since the fixed film 206 is black and absorbs almost all of the incident light, which is therefore not reflected. As described above, according to the positions of the actuatable films 203 to 205, it is possible to cause a pixel to provide monochromatic display.

Furthermore, by combining the positions of the three layers of actuatable films 203 to 205, it is possible to provide color display. For example, when the display section is covered with only an actuatable film that reflects only red and the other two layers are housed in the fixed film 206, red light will be reflected; and when the display section is covered with the two layers of red and green and the blue layer is housed, yellow light is reflected. As shown in FIG. 52, the pixel display sections 201, 202, . . . are arranged at regular intervals and the actuatable films 203 to 205 and the fixed films 206, 207, . . . hiding the actuatable films are grouped into a set to form a pixel. Although not shown, such pixels are arranged in a two-dimensional matrix, thereby forming the entire display section of the image display module. Combinations of the actuatable films in displaying the individual colors are shown in Table 1 below.

TABLE 1

| Reflectivity | Displayed color | | | | | | | |
|---|---|---|---|---|---|---|---|---|
| | | White | Black | Red | Green | Blue | Yellow | Magenta | Cyan |
| Actuatable film 203 | Red | P | A | P | A | A | P | P | A |
| Actuatable film 204 | Green | P | A | A | P | A | P | A | P |
| Actuatable film 205 | Blue | P | A | A | A | P | A | P | P |
| Fixed film | Black | — | — | — | — | — | — | — | — |

Figures 53, 55:
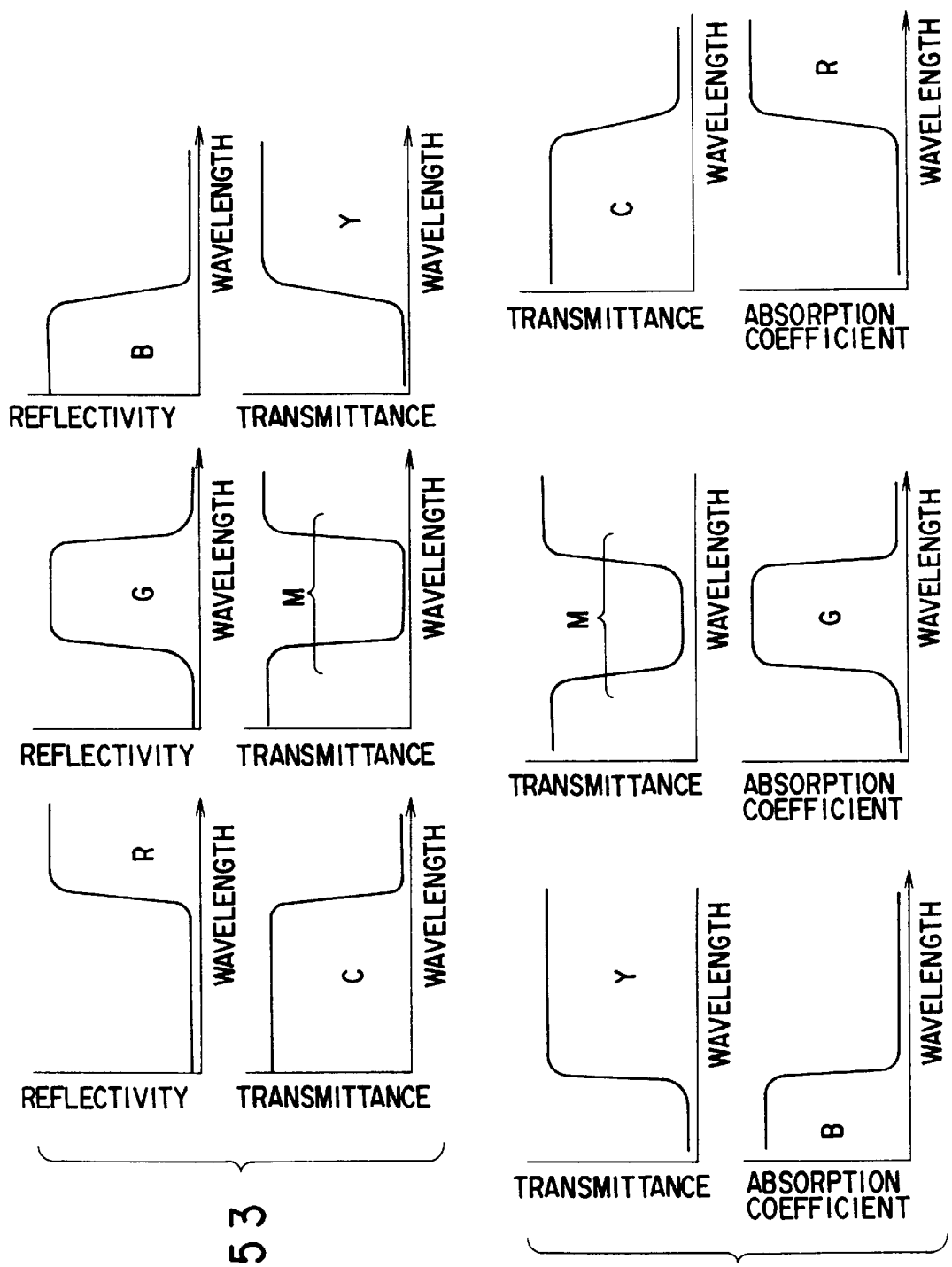
FIG. 53 shows the reflection and transmission characteristics of the actuatable film in the display module of the fourth embodiment.
FIG. 55 shows the reflection and transmission characteristics of the actuatable film in the display module of the fifth embodiment.

P (present): a state where the actuatable film covers the display section
A (absent): a state where the actuatable film is placed under the black fixed plate of the adjacent pixel FIG. 53 shows the spectral reflectance characteristic and spectral transmittance characteristic of each actuatable film. The two diagrams at the left show the reflectivity (the top) and the transmittance (the bottom) of actuatable film 203; the two diagrams in the center show the reflectivity and the transmittance of actuatable film 204; and the two diagrams at the right show the reflectivity and the transmittance of actuatable film 205. The individual films reflect the light in the specific wavelength regions of the incident light and allow the light in the wavelength regions of the remaining complementary colors to pass through. Use of three layers, or the stacking of three reflection characteristics achieves an almost constant high reflectivity over the entire visible wavelength region.

A concrete configuration of the display module and its driving method are the same as in the first embodiment, and a detailed explanation thereof will be omitted.

With the above configuration, the projection-type display device of the present embodiment does not experience light absorption at the filter in displaying white, as compared with a conventional equivalent. Because the device uses no polarizing plate and therefore can make use of the light from the light source without almost any loss, it helps improve the light use efficiency. Because of the high light use efficiency, the amount of light from the light source can be suppressed to the necessary minimum. Furthermore, the device needs only one display module, the power consumption can be reduced.

Furthermore, with the embodiment, for the structure of the actuatable film, a non-absorption interference filter layer can be formed either by forming a dielectric multilayer film on a transparent substrate by sputtering or evaporation or by sandwiching a cholesteric liquid-crystal layer with a spiral pitch corresponding to a desired passing band by printing techniques. A transparent insulating material is desirable for an insulating material forming an actuatable film. Such materials include polyimide, polyester, polytetrafluoroethylene, polyamide, polyurethane, and polyepoxide.

It is desirable that the reflection wavelength regions of the individual layers should not overlap with each other and the reflectivity be as high as possible over the entire region, from the viewpoint of light use efficiency. Since the edge portion of the band is preferably shaper, it is desirable that in the dielectric multilayer film, the number of laminations of high-refractive-index layers and low-refractive-index layer should be 10 or more, from the viewpoint of color reproduction. In this case, although ringing occurs due to high-order interference, if the reflectivity is within 5%, it will not become a problem. To maximize the reflectivity in displaying white, an actuatable film where a mirror reflection layer of Al, Ag, or Cr is formed on the display section by evaporation or sputtering, may be added to form a four-layer structure. By adding the actuatable film on the top, a reflection loss at the dielectric multilayer film and a loss due to multiple reflection between actuatable films can be prevented, achieving a very good reflectivity.

The fixed film, the base, is a black absorption layer. It is desirable that the fixed film should be black and not impede the horizontal movement of the actuatable film. It is favorable that the fixed film has a porous carbon black or light trap structure. Black can also be displayed on the screen by preventing more intense mirror reflection light from entering the projection lens by diffuse reflection or by reflecting it in a direction other than the projection lens direction, instead of causing light to be absorbed. When the incident light is forced to undergo diffuse reflection, it is desirable that a white scattering member of $BaSO_4$ or MgO should be formed by evaporation or sputtering. When light is forced to undergo specular reflection in a direction other than toward the projection lens, a high-reflectivity material of Al, Ag, or Cr may be formed on the slope or a retroreflective transparent ball may be provided at the top of the mirror surface. In any case, when the surface of the fixed film in the display section is made of conductive material, the electrodes for horizontal movement of the actuatable film can be formed simultaneously, which is desirable in terms of processing.

Fifth Embodiment

The entire configuration of a projection-type display device according to a fifth embodiment of the present invention is the same as that of the fourth embodiment of FIG. 51 and an explanation of the configuration will be omitted. The structure of a display module of the fifth embodiment is shown in FIG. 54. The fifth embodiment differs from the fourth embodiment in that the display sections 701, 702, ... of the actuatable films 703 to 705 are absorption color filters that allow yellow, magenta, and cyan to pass through and absorb blue, green, and red and the surfaces of the fixed films 706, 707, ... are Al reflecting surfaces.

In this case, in the pixel display section 701 where all of the three layers of actuatable films 703, 704, 705 cover the display section, the incident light is all absorbed by the three-layer color filter. Specifically, the first layer of actuatable film 703 absorbs the wavelength region corresponding to blue, the second layer of actuatable film 704 absorbs the wavelength region corresponding to green, and the third layer of actuatable film 705 absorbs the wavelength of green. As a result, there is no reflected light at the pixel display section 701 and black is displayed. On the other hand, in the adjacent pixel display section 202, all of the actuatable films 703 to 705 are placed under the fixed film 706 of the adjacent pixel, so that light directly enters the fixed film 707. Since an Al reflecting surface is formed on the fixed film 707, nearly 100% of the light is emitted as the reflected light representing white.

With the present embodiment, the complete reverse of the arrangement of the fourth embodiment makes monochromatic display possible.

FIG. 55 shows the transmittance characteristic and absorption coefficient characteristic of each actuatable film. The two diagrams at the left show the transmittance (the top) and the absorption coefficient (the bottom) of actuatable film 703; the two diagrams in the center show the transmittance and the absorption coefficient of actuatable film 704; and the two diagrams at the right show the transmittance and the absorption coefficient of actuatable film 705. The individual films absorb the light in the specific wavelength regions of the incident light and allow the light in the wavelength regions of the remaining complementary colors to pass through. From the absorption characteristics of red, green, and blue, the stacking of all of the three layers enables almost 100% light to be absorbed over the entire visible wavelength region and therefore the transmitted light becomes almost zero. Combinations of the actuatable films in displaying the individual colors are shown in Table 2 below.

layer structure so as to absorb all of the light to display black, as in additive color processing. A white scattering member formed by the evaporation or sputtering of $BaSO_4$ or MgO that diffuse-reflects light to make the projected light from the pixel black, or a reflecting surface provided with a slant reflecting mirror surface or retroreflective material that reflects light in a direction other than the specular reflection direction, may be added to the top of the actuatable film. The actuatable film lowers the luminance in displaying black and improve the contrast.

Sixth Embodiment

Figure 56:
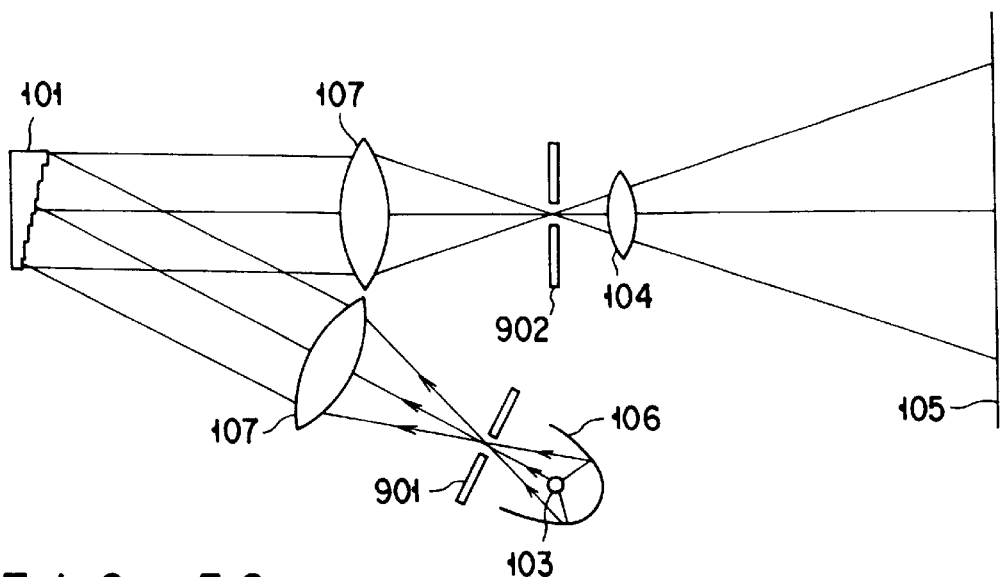
FIG. 56 shows a schematic configuration of a projection-type display device according to a sixth embodiment of the present invention.

FIG. 56 shows a sixth embodiment of the present invention. This embodiment is characterized by employing what is called a Schlieren optical system. Specifically, diaphragms 901, 902 are provided on the light source side and the projection lens side, respectively, whereby the angle of the light incident on a display module 101 is limited. In addition, as for the light reflected by the display surface of the display module 101, only the light that has undergone specular reflection properly passes through a projection lens 104 and is projected onto a screen 105. The scattered light is blocked by the diaphragm and consequently cannot reach the screen.

Figure 57:
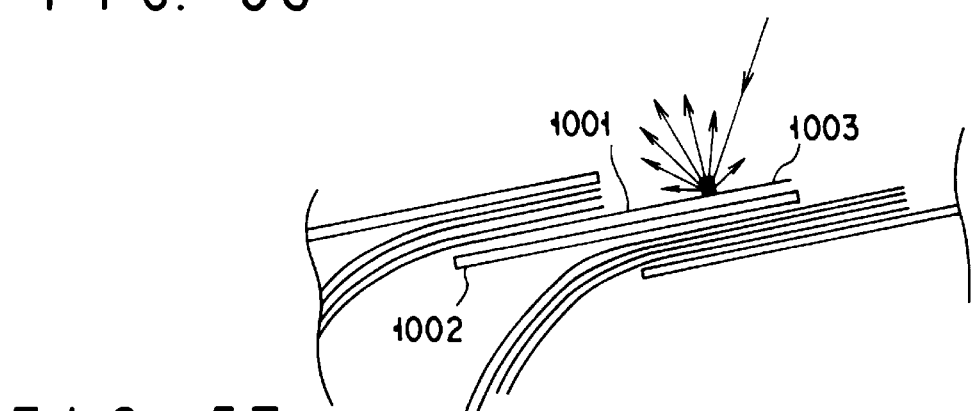
FIG. 57 is a sectional view of the display module of the sixth embodiment.

The display module 101 of the present embodiment is composed of four color filters, yellow, magenta, cyan, and black, as shown in FIG. 57, and provides full-color display by subtractive color processing. In addition to a yellow,

TABLE 2

| | Reflect-ivity | Displayed color | | | | | | | |
|---|---|---|---|---|---|---|---|---|---|
| | | White | Black | Red | Green | Blue | Yellow | Magenta | Cyan |
| Actuatable film 703 | Yellow | A | P | P | P | A | P | A | P |
| Actuatable film 204 | Magenta | A | P | P | A | P | A | P | A |
| Actuatable film 705 | Cyan | A | P | A | P | P | A | A | P |
| Fixed film | Al surface | — | — | — | — | — | — | — | — |

P (present): a state where the actuatable film covers the display section
A (absent): a state where the actuatable film is placed under the white fixed plate of the adjacent pixel With the fifth embodiment, in addition to a similar effect to that of the fourth embodiment, the design flexibility can be made greater in color reproduction, because an absorption color filter can be used without reducing the light use efficiency in displaying white.

In the fifth embodiment, when display is effected by subtractive color processing, the display section of the actuatable film is made of yellow, cyan, and magenta absorption color filters. It is most desirable that the color filters should have a structure in which heat-resistant pigment coloring material is distributed in an actuatable film substrate. The structure of the fixed film is such that a high-reflectivity material such as Al is formed on the surface so as to enable mirror reflection. Apparently, it is desirable that the stripe electrodes in the nondisplay section of the fixed film and the mirror reflection section should be made of the same material simultaneously, from the viewpoint of processing. Furthermore, the actuatable film may have a four-magenta, and cyan absorption color filters 1001 explained in FIG. 55 in the fifth embodiment, a fourth actuatable film 1003 is provided directly on a fixed film 1002 provided with an Al reflecting surface at the lowest layer. On the actuatable film 1003, a white scattering member made of $BaSO_4$ is provided.

The newly added fourth actuatable film 1003 is an actuatable film for display black. Specifically, when black is displayed in the sixth embodiment, the three actuatable films 1001, yellow, magenta, and cyan, are placed under the fixed film and only the fourth actuatable film 1003 is allowed to cover the display section. In this case, the incident light is turned into scattered light by the white scattering member of the actuatable film 1003, so that the light passing through the diaphragm and reaching the screen is limited to very few solid angle components. Combinations of the actuatable films in displaying the individual colors are shown in Table 3 below.

TABLE 3

|  | Reflect-ivity | Displayed color (projection/direct viewing) | | | | | | | |
|---|---|---|---|---|---|---|---|---|---|
|  |  | White | Black | Red | Green | Blue | Yellow | Magenta | Cyan |
| Actuatable film | Yellow | A | A/P | P | P | A | P | A | A |
| Actuatable film | Magenta | A | A/P | P | A | P | A | P | A |
| Actuatable film | Cyan | A | A/P | A | P | P | A | A | P |
| Actuatable film | White | A/P | P/P* | A/P | A/P | A/P | A/P | A/P | A/P |
| Fixed film | A1 surface | — | — | — | — | — | — | — | — |

P (present): a state where the actuatable film covers the display section
A (absent): a state where the actuatable film is placed under the white fixed plate of the adjacent pixel
*: absent is also permissible Therefore, such an arrangement enables black display. In the projection type display device, the black display corresponds to the white display in the direct viewing type display device. White display and the other color display are performed as in the fifth embodiment.

The sixth embodiment also produces the same effect as with the fourth embodiment. In addition, when black is displayed in the sixth embodiment, because the incident light is not absorbed by the color filter, the heat load can be reduced remarkably as compared with the fifth embodiment, preventing the color filter from deteriorating.

Furthermore, with the present embodiment, the display module can be removed and this independent display module can be used as a direct-viewing-type display module. Namely, the display module can be used as both of the projection type and the direct-viewing type. For direct viewing use, the above-described black-display state presents scattering white, so that the former turns into a white display state in the direct-viewing-type display module. As in the fifth embodiment, by covering the display section with the first to third actuatable films to cause the color filters to absorb all of the visible wavelength region, black display can be realized. During direct-viewing use, the fourth actuatable film always covers the display section.

Seventh Embodiment

Figure 58:
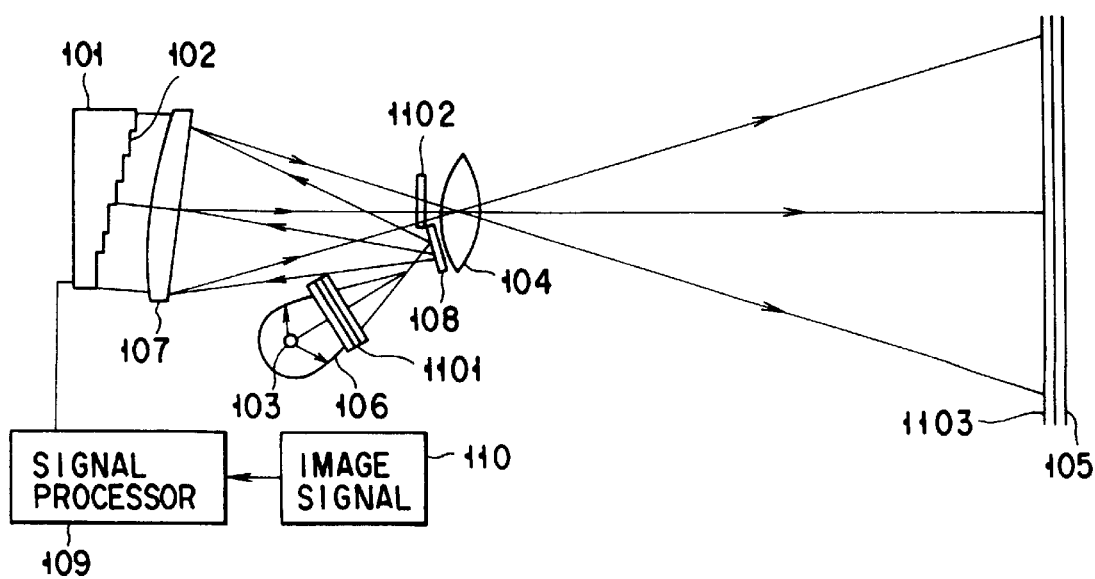
FIG. 58 shows a schematic configuration of a projection-type display device according to a seventh embodiment of the present invention.

FIG. 58 is a drawing to help explain a seventh embodiment of the present invention. The seventh embodiment is characterized by employing additive color processing and using a cholesteric liquid crystal as an interference filter layer of actuatable film. An interference filter reflects light of a given wavelength and passes through light of other wavelength (complemental color). There is no absorption of light in the interference filter. Contrary to the interference filter, a color filter absorbs light of a given wavelength and passes through light of other wavelength (complemental color). The light of a complemental color is reflected by a fixed film and passes through the filter to display the color.

When the interference filter layer is a cholesteric liquid crystal, the selective reflection of circularly polarized light takes place. Therefore, in the case of the light from an ordinary unpolarized light source, only about 50% of the light is reflected even in the reflection wavelength region. In the present embodiment, by providing the following optical component parts, the unpolarized light from the light source is converted into circularly polarized light. Three layers of red, green, and blue cholesteric liquid-crystal films 1101 having the same characteristics as that of the interference filter layer of the actuatable film are stacked together as a non-absorption polarizer, which is provided between a reflector 106 and a micromirror 108. The non-absorption polarizer 1101 reflects 50% of the light from the light source in the reflection band and returns it to the light source side. The transmitted light is made up of the circularly polarized light component that passed through the interference filter of the actuatable film and a few components that are not related to projection, or that always pass through the interference filter regardless of the reflection band and is absorbed at the fixed film. Then, the transmitted light from the non-absorption polarizer is reflected by the micromirror 108. At this time, the phase of the circularly polarized light reverses 180 degrees, which means that it is converted into the circularly polarized light in the opposite direction, that is, the component reflected by the interference filter layer of the actuatable film. The light component reflected at the light-source side is converted into transmitted components by undergoing mirror reflection at the reflector 106, so that the light from the light source can be converted into a desired circularly polarized light efficiently.

Since the component reflected by the display module 101 is also circular polarized light, the circularly polarized light can be converted into linearly polarized light by providing a quarter-wave plate 1102 between the display module 101 and the projection lens 104. Therefore, use of a screen 105 with a polarizing film 1103 can reduce to a half the stray light that decreases the contrast of the projected image, such as the light from indoor illumination. The azimuth of the transmission axis of the polarizing film 1103 may point in any direction. The quarter-wave plate 1102 is rotated and adjusted so as to agree with the polarizing direction of the image projected in the azimuth of the transmission axis.

FIG. 59A shows the spectral reflectance characteristic for the case where natural light enters a cholesteric liquid-crystal layer used in the present embodiment. FIG. 59B shows the spectral reflectance characteristic for the case where right-handed circularly polarized light enters the cholesteric liquid-crystal layer. FIG. 59C shows the transmittance characteristic for the case where right-handed circularly polarized light enters the cholesteric liquid-crystal layer.

The present embodiment also produces the same effect as with the fourth embodiment, In addition, use of a cholesteric liquid crystal enables the simplification of the structure of the display section in the device. Furthermore, because polarized light is used, it is possible to provide a projection-type display device immune to external stray light and excellent in contrast. The present invention is not limited to the above embodiments, but may be practiced or embodied in still other ways without departing from the spirit or essential character thereof.

It is desirable that the light source should be a white light source, such as a metal halide lamp or a halogen lamp, from the points of view of light-emitting efficiency and color reproduction.

The positional relationship between the light source, display module, and projection lens is such that the light emitted from the light source undergoes specular reflection at the display module and enters the projection lens. Namely, it is desirable that the tilt angle of the optical axis of each of the light source and the projection lens should be equal with respect to the normal line of the display module surface. The tilt angle is preferably as small as possible. The optimum tilt angle is in the range of 4 degrees to 20 degrees. To minimize the system size, the optical path can be changed in the middle by inserting a plane mirror between the display module and the light source, or between the display module and the projection lens.

Furthermore, it is desirable that a shielding plate should be provided between the projection lens and the light source so that the light from the light source may not become stray light after direct entering the projection lens.

Furthermore, it is preferable that the light incident on the display module is parallel light, in order to assure the light use efficiency and make the aperture of the lens system. To obtain parallel light, the reflector is preferably a parabolic mirror, a combination of an rotational elliptical mirror and a lens, or a holographic optical element (HOE).

Furthermore, to change the optical path by inserting a mirror in the optical path, the mirror on the light source side may be a convex mirror or a concave mirror to achieve both of the function of changing the optical path and the function of making light parallel at the same time. When the light reflected from the display module is allowed to enter the projection lens, the emitted light may be gathered by a convex lens again in order to make the aperture of the projection lens smaller. At this time, it is most desirable that the gathered light spot should focus on the entrance pupil of the projection lens.

As explained above, according to the fourth to seventh embodiments, it is possible to provide a projection-type display device which is simpler in configuration, has a high light use efficiency, and displays a bright or less-power-consuming color image.

The projection-type display device is characterized by being composed of a three-layer absorption color filter and effecting color display by attractive color processing of the three primary colors.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

With the display device according to the present invention, the actuatable films placed on the fixed section are moved by the driving section using electrostatic force and the films thus moved are used as a pixel, or a display section. Because colored films are used to display a screen, a polarizing plate is not required. No electrode, such as ITO, is not formed in the display section, so that the light use efficiency is high. Because the driving section is formed so as not to impede the representation on the display section, the aperture rate is high. As a result, the reflection luminance is high.

Furthermore, the display device has a display image memory function and need not be driven again until the display is changed, with the result that it consumes less power.

In addition, with the present invention, by bringing the unselected scanning lines or signal lines into a floating potential state, the capacitive load in driving can be made smaller. This makes it possible to reduce the power consumption much more.

Furthermore, it is also possible to provide a projection-type display device which is simple in construction, has a high light use efficiency, is brighter, and consumes less power.

What is claimed is:

1. A display device comprising:
   a fixed section of a first color;
   a plurality of actuatable sections provided on said fixed section and corresponding to a plurality of pixels, the actuatable sections being of a second color; and
   driving means for shifting each of said plurality of actuatable sections by making use of electrostatic force, and for moving the actuatable section on the fixed section of each pixel to under the fixed section of an adjacent pixel.

2. A device according to claim 1, wherein said fixed section comprises a film.

3. A device according to claim 1, wherein said fixed section comprises a white opaque film, and said actuatable sections comprise a cyan transparent film, a magenta transparent film, and a yellow transparent film.

4. A device according to claim 3, wherein said actuatable sections further comprise a black opaque film.

5. A device according to claim 1, further comprising a plurality of insulating films provided between said fixed section and each of said plurality of actuatable sections.

6. A device according to claim 1, wherein
   said fixed section comprises first electrodes;
   said actuatable sections comprise second electrodes; and
   said driving means comprises means for moving said actuatable sections by making use of horizontal force acting between the first and second electrodes according to polarities of the first and second electrodes.

7. A device according to claim 6, wherein a pitch of said first electrodes and a pitch of the second electrodes are determined so that an area where the first and second electrodes overlap with each other and an area where the first electrodes shift from the second electrodes appear alternately.

8. A device according to claim 6, wherein said driving means comprises means for bringing the first and second electrodes corresponding to the actuatable sections not driven into a floating potential state.

9. A device according to claim 3, wherein
   said fixed section comprises a first electrode;
   each of said cyan transparent film, said magenta transparent film, and said yellow transparent film comprises a second electrode;
   another fixed film with the first electrode is inserted between each two of said transparent films; and
   said driving means comprises means for moving said transparent films by making use of horizontal force acting between the first and second electrodes according to the polarities of said first and second electrodes.

10. A device according to claim 1, further comprising means for projecting an image displayed by the actuatable sections driven by said driving means.

11. A display device comprising:
a fixed section of a first color;
a plurality of actuatable sections provided on said fixed section and corresponding to a plurality of display pixels, the actuatable sections being of a second color;
a plurality of supports for supporting said plurality of actuatable sections; and
driving means for shifting said actuatable sections by bending said supports making use of electrostatic force, and for moving the actuatable section on the fixed section of each pixel to under the fixed section of an adjacent pixel.

12. A device according to claim 11, further comprising means for stopping said actuatable sections at a given position by making use of electrostatic force.

13. A device according to claim 12, wherein said stopping means comprises a capacitor that generates electrostatic force for stopping.

14. A device according to claim 13, wherein said capacitor comprises a transparent first electrode formed on a protective transparent plate provided on the actuatable sections and a second electrode provided on said actuatable sections.

15. A device according to claim 13, wherein said capacitor comprises a transparent first electrode formed on a protective transparent plate provided on the actuatable sections and a second electrode provided on said fixed section.

16. A device according to claim 11, wherein said fixed section comprises a film.

17. A device according to claim 11, wherein said fixed section comprises a white opaque film, and each of said plurality of actuatable sections comprises a cyan transparent film, a magenta transparent film, and a yellow transparent film.

18. A device according to claim 17, wherein each of said plurality of actuatable sections further comprises a black opaque film.

19. A device according to claim 11, wherein each of said supports comprises a cantilever-like film having one end connected to each of said actuatable sections and the other end secured, the film having a first electrode, and said driving means comprises a second and third driving electrodes provided on both sides of said film and means for applying voltages of a given polarity to said first, second, and third driving electrodes.

20. A device according to claim 19, wherein said voltage applying means comprises means for bringing said first, second, and third electrodes into a floating potential state when the actuatable sections are not driven.

21. A device according to claim 11, further comprising means for projecting an image displayed by the actuatable sections driven by said driving means.

22. A display device comprising:
a fixed section of a first color;
a plurality of actuatable sections provided on said fixed section and corresponding to a plurality of display pixels, the actuatable sections being of a second color;
a plurality of supports for supporting said plurality of actuatable sections;
a plurality of piezoelectric elements provided on said plurality of supports; and
driving means for shifting said actuatable sections by energizing said piezoelectric elements and thereby bending said support and for moving the actuatable section on the fixed section of each pixel to under the fixed section of an adjacent pixel.

23. A device according to claim 22, further comprising means for stopping said actuatable sections at a given position by making use of electrostatic force.

24. A device according to claim 23, wherein said stopping means comprises a capacitor that generates electrostatic force for stopping.

25. A device according to claim 24, wherein said capacitor comprises a transparent first electrode formed on a protective transparent plate provided on the actuatable sections and a second electrode provided on said actuatable sections.

26. A device according to claim 24, wherein said capacitor comprises a transparent first electrode formed on a protective transparent plate provided on the actuatable sections and a second electrode provided on said fixed section.

27. A device according to claim 22, wherein said fixed section comprises a film.

28. A device according to claim 22, wherein said fixed section comprises a white opaque film, and each of said plurality of actuatable sections comprises a cyan transparent film, a magenta transparent film, and a yellow transparent film.

29. A device according to claim 28, wherein each of said plurality of actuatable sections further comprises a black opaque film.

30. A device according to claim 22, wherein each of said supports comprises a cantilever-like film having one end connected to each of said actuatable sections and the other end secured, the film having a first electrode, and said driving means comprises a second and third driving electrodes provided on both sides of said film and means for applying voltages of a given polarity to said first, second, and third driving electrodes.

31. A device according to claim 30, wherein said voltage applying means comprises means for bringing said first, second, and third electrodes into a floating potential state when the actuatable sections are not driven.

32. A device according to claim 22, further comprising means for projecting an image displayed by the actuatable sections driven by said driving means.

33. A display device comprising:
a plurality of fixed sections arranged in a two-dimensional matrix, the fixed sections being of a first color and corresponding to pixels;
a plurality of actuatable sections provided on said plurality of fixed sections, the actuatable sections being of a second color;
a plurality of supports for supporting said actuatable sections; and
driving means for shifting said actuatable sections by bending said supports by making use of electrostatic force, and for moving the actuatable section on the fixed section of each pixel to under the fixed section of an adjacent pixel.

34. A device according to claim 33, wherein said driving means comprises two electrodes that sandwich each of said actuatable sections and generate electrostatic force to bend the supports.

35. A device according to claim 33, wherein said actuatable sections are connected to signal lines for transmitting an image signal and said two electrodes are connected to scanning lines that select a pixel to display the image signal.

36. A device according to claim 35, wherein said driving means comprises means for placing the potential of said signal lines and the potential of said scanning lines at a floating potential when the actuatable sections are not driven.

37. A device according to claim 34, wherein said two electrodes are connected to signal lines for transmitting an image signal, and said actuatable sections are connected to scanning lines that select pixels to display the image signal.

38. A device according to claim 37, wherein said driving means comprises means for placing the potential of said signal lines and the potential of said scanning line at a floating potential when the actuatable section is not driven.

39. A device according to claim 33, further comprising means for projecting an image displayed by the actuatable sections driven by said driving means.

40. A display device comprising:

a fixed section of a first color with a plurality of first electrodes, corresponding to a plurality of pixels;

a plurality of actuatable sections provided on said fixed section and corresponding to said plurality of pixels, the actuatable sections being of a second color and having second electrodes; and driving means for shifting said plurality of actuatable sections by controlling polarities of said first and second electrodes and thereby generating electrostatic force, and for moving the actuatable section on the fixed section of each pixel to under the fixed section of an adjacent pixel, the polarity of the first electrodes and polarity of the second electrodes being placed at a floating potential when said actuatable sections are not driven.

41. A device according to claim 39, wherein said plurality of actuatable sections are arranged into a two-dimensional matrix where the second electrodes corresponding to the pixels in each row are connected to scanning lines and the first electrodes corresponding to the pixels in each column are connected to signal lines, and said driving means selects the scanning lines sequentially and then selects a signal line for each scanning line one after another, with the unselected scanning lines and the unselected signal lines being placed at a floating potential.

42. A device according to claim 40, further comprising means for projecting an image displayed by the actuatable sections driven by said driving means.

43. A projection-type display device comprising:

a fixed section of a first color;

a plurality of actuatable sections provided on said fixed section and corresponding to a plurality of pixels, the actuatable sections being of a second color;

driving means for shifting said actuatable sections by making use of electrostatic force and moving the actuatable section on the fixed section of each pixel to under the fixed section of an adjacent pixel, and thereby controlling colors of the pixels; and means for projecting an image of the pixels whose colors are controlled by said driving means.

44. A device according to claim 43, wherein said actuatable sections comprise a plurality of long, narrow, rectangular colored films stacked one on top of another, with these colored films being sandwiched by fixed films constituting said fixed section.

45. A device according to claim 43, wherein said actuatable sections comprise a film made of one of the following insulating materials: polyimide, polyester, polytetrafluoroethylene, polyamide, polyurethane, and polyepoxide.

46. A device according to claim 43, wherein said actuatable sections comprise three colored films that reflect additive primary colors, red, green, and blue.

47. A device according to claim 43, wherein said actuatable sections comprise three colored films that allow subtractive primary colors, yellow, cyan, and magenta, to pass through.

* * * * *